United States Patent
Schjerven, Sr. et al.

(10) Patent No.: US 11,369,118 B2
(45) Date of Patent: Jun. 28, 2022

(54) CONVEYOR OVEN HEAT DELIVERY SYSTEM

(71) Applicant: THE MIDDLEBY CORPORATION, Elgin, IL (US)

(72) Inventors: William S. Schjerven, Sr., Schaumburg, IL (US); Richard H. Van Camp, Aurora, IL (US); Theodore James Chmiola, Roscoe, IL (US); Mohan K. Panicker, Darien, IL (US)

(73) Assignee: THE MIDDLEBY CORPORATION, Elgin, IL (US)

( * ) Notice: Subject to any disclaimer, the term of this patent is extended or adjusted under 35 U.S.C. 154(b) by 284 days.

(21) Appl. No.: 16/498,179

(22) PCT Filed: Apr. 4, 2018

(86) PCT No.: PCT/US2018/026068
§ 371 (c)(1),
(2) Date: Sep. 26, 2019

(87) PCT Pub. No.: WO2018/187458
PCT Pub. Date: Oct. 11, 2018

(65) Prior Publication Data
US 2021/0100253 A1 Apr. 8, 2021

Related U.S. Application Data

(60) Provisional application No. 62/483,206, filed on Apr. 7, 2017.

(51) Int. Cl.
*A21B 1/24* (2006.01)
*A21B 1/42* (2006.01)
(Continued)

(52) U.S. Cl.
CPC ............ *A21B 1/48* (2013.01); *A21B 1/245* (2013.01); *A21B 1/26* (2013.01); *F24C 15/025* (2013.01)

(58) Field of Classification Search
CPC ... A21B 1/24-28; A21B 1/42-44; A21B 1/46; A21B 1/48; A47J 37/1242-1247
See application file for complete search history.

(56) References Cited

U.S. PATENT DOCUMENTS 2,668,366 A 2/1954 Barnett
3,375,792 A 4/1968 Seeder
(Continued)

FOREIGN PATENT DOCUMENTS

CN 203102114 U 7/2013
CN 206410219 U 8/2017
(Continued)

OTHER PUBLICATIONS

International Search Report and Written Opinion for Application No. PCT/US2018/026068 dated Dec. 4, 2018 (11 pages).
(Continued)

*Primary Examiner* — Michael A Laflame, Jr.
(74) *Attorney, Agent, or Firm* — Michael Best & Friedrich LLP

(57) ABSTRACT

Conveyor ovens for cooking food according to various embodiments include one or more passive tubes in a plenum positioned opposite one or more burner tubes, wherein the passive tubes have outer walls with apertures therethrough. In some cases, a burner assembly for a conveyor oven includes at least one burner tube extending into a plenum and positioned to receive at least a portion of a flame emitted by the burner assembly, wherein a rifling plate extends through the burner tube and is slidingly positioned within the burner tube. Also, in some cases a baffle in a plenum of (Continued)

the oven is positioned opposite the burner tube and defines a fluid conduit having an entrance into which air heated from the burner tube is received and an exit separate from the entrance and through which air is discharged.

27 Claims, 15 Drawing Sheets

(51) Int. Cl.
*A21B 1/48* (2006.01)
*A21B 1/26* (2006.01)
*F24C 15/02* (2006.01)

(56) References Cited

U.S. PATENT DOCUMENTS

| | | | |
|---|---|---|---|
| 4,774,631 A | 9/1988 | Okuyama et al. | |
| 4,964,392 A | 10/1990 | Bruno et al. | |
| 5,223,290 A | 6/1993 | Alden | |
| 5,277,105 A | 1/1994 | Bruno et al. | |
| 5,788,467 A | 8/1998 | Zenitani et al. | |
| 5,901,641 A * | 5/1999 | McNamara | F28F 13/12 |
| | | | 99/403 |
| 5,906,485 A | 5/1999 | Groff et al. | |
| 6,084,214 A | 7/2000 | Tallman et al. | |
| 6,115,250 A | 9/2000 | Schmitt | |
| 6,168,396 B1 | 1/2001 | Homola | |
| 6,186,889 B1 | 2/2001 | Byrne | |
| 6,396,031 B1 | 5/2002 | Forrester | |
| 6,407,918 B1 | 6/2002 | Edmunds et al. | |
| 6,481,433 B1 | 11/2002 | Schjerven, Sr. et al. | |
| 6,526,961 B1 * | 3/2003 | Hardenburger | A21B 1/48 |
| | | | 126/21 A |
| 6,655,373 B1 | 12/2003 | Wiker | |
| 6,714,411 B2 | 3/2004 | Thompson et al. | |
| 6,839,233 B2 | 1/2005 | Cravens et al. | |
| 7,054,155 B1 | 5/2006 | Mease et al. | |
| 7,624,728 B1 | 12/2009 | Forbes | |
| 8,087,407 B2 | 1/2012 | Wiker et al. | |
| 8,281,779 B2 | 10/2012 | Wiker et al. | |
| 9,585,401 B2 | 3/2017 | Wiker et al. | |
| 2001/0055740 A1 | 12/2001 | Bloom et al. | |
| 2002/0094283 A1 | 7/2002 | Salmen et al. | |
| 2003/0042244 A1 | 3/2003 | Zapata et al. | |
| 2004/0063058 A1 | 4/2004 | Orbeck et al. | |
| 2004/0231301 A1 | 11/2004 | Vandertuin et al. | |
| 2005/0026100 A1 | 2/2005 | Hawkins et al. | |
| 2008/0245359 A1 | 10/2008 | Williamson | |
| 2008/0264407 A1 * | 10/2008 | Bramhall | A21B 1/245 |
| | | | 126/39 E |
| 2010/0058936 A1 | 3/2010 | Schjerven, Sr. et al. | |
| 2010/0104997 A1 * | 4/2010 | Wolfe | A21B 1/245 |
| | | | 432/152 |
| 2010/0267188 A1 | 10/2010 | Parks et al. | |
| 2011/0048245 A1 | 3/2011 | Schjerven, Sr. et al. | |
| 2011/0139142 A1 * | 6/2011 | Schalueck | F24C 3/087 |
| | | | 126/39 E |
| 2011/0269085 A1 | 11/2011 | Wiker et al. | |
| 2012/0152499 A1 | 6/2012 | Seccuro et al. | |
| 2012/0152502 A1 | 6/2012 | Seccuro et al. | |
| 2012/0294596 A1 | 11/2012 | Agnello et al. | |
| 2015/0140499 A1 | 5/2015 | Lewis | |

FOREIGN PATENT DOCUMENTS

| | | |
|---|---|---|
| WO | 2017191551 A1 | 11/2017 |
| WO | 2018187457 A1 | 10/2018 |

OTHER PUBLICATIONS

International Preliminary Report on Patentability for Application No. PCT/US2018/026068 dated Oct. 17, 2019 (8 pages).

* cited by examiner

CONVEYOR OVEN HEAT DELIVERY SYSTEM

CROSS-REFERENCE TO RELATED APPLICATIONS

Priority is hereby claimed to U.S. provisional patent application No. 62/483,206 filed on Apr. 7, 2017, the entire contents of which are incorporated herein by reference.

BACKGROUND

Conveyor ovens are widely used for cooking pizzas and a wide variety of other food products. Examples of such ovens are shown, for example, in U.S. Pat. Nos. 5,277,105, 6,481,433 and 6,655,373, as well as U.S. Pat. Nos. 8,281,779, 8,087,407, and 9,585,401.

Conveyor ovens are typically large metallic housings with a heated tunnel extending through them and a conveyor running through the tunnel. In many cases, such conveyor ovens are either 70 or 55 inches long, although they may be constructed in any other suitable size. The conveyor transports food products through the heated oven tunnel at a speed which cooks food products during their transit through the tunnel. Conveyor ovens typically include a heat delivery system including one or more blowers which supply heat to the tunnel through passageways leading to metal fingers opening into the oven tunnel. Such metal fingers are often located above and below the conveyor. The metal fingers act as airflow channels that deliver streams of hot air which impinge upon the surfaces of the food products passing through the tunnel on the conveyor. In modern conveyor ovens, a microprocessor-driven control panel generally enables the user to regulate heat delivery (e.g., to control the temperature within the oven, the heat output of the heat delivery system, and the like), the speed of the conveyor, and other oven functions to properly cook food product being transported through the oven.

Conveyor ovens are generally controlled with the intent to achieve repeatable and controllable heating of the oven chamber. The conveyor generally travels at a speed calculated to properly cook food products on the conveyor belt during the time period required for the conveyor to carry the food products through the entire length of the oven tunnel. In some conveyor ovens, other food products requiring less time to cook may be placed on the conveyor at a point partially through the oven chamber so that they travel only a portion of the length of the tunnel. A pizza is an example of a food product which might require the full amount of cooking time in order to be completely cooked in the oven. A sandwich is an example of a product which might require only a portion of the full cooking time. In conventional conveyor ovens, the time required to cook a pizza, for example, from an uncooked state to a fully cooked state is in excess of 4 or 5 minutes, regardless of how much heat and air flow are supplied to the conveyor supporting the pizza.

Conveyor ovens are typically used in restaurant kitchens and commercial food manufacturing facilities. Typically, they are kept running for extended periods of time, including periods when food products are not being cooked. Since the inlet and outlet ends of the oven tunnel are open, this means that heat and noise are continuously escaping from the conveyor oven tunnel into the surrounding environment. This escape of heat wastes energy, and also warms the surrounding environment often to unnecessary and uncomfortable levels. This is particularly the case where the conveyor oven is being used in relatively cramped restaurant kitchen environments. The escaping noise is also undesirable, since it may interfere with interpersonal communication among those working near the oven.

Conventional conveyor ovens also provide users with limited ability to reduce energy losses while running at less than full capacity. In many cases, users only have the ability to turn such ovens on or off, which often involves unacceptably long shut-down and/or start-up times. Therefore, it is often necessary to leave such ovens on (or in a state in which they consume excessive energy) despite the waste of fuel or other energy supplied to the ovens when cooking food intermittently. It is not uncommon for a conventional conveyor oven to be left running in full production mode for substantially the entire period of time a restaurant or other cooking facility is open.

It is generally desirable to maintain controlled heating and temperatures within the tunnel of a conveyor oven during operation. Among the challenges to be overcome in achieving such controlled heating and temperatures are the inherent variations in heating from oven to oven due to variations in the internal physical environment of otherwise identical ovens. A more significant challenge is the constantly changing physical and thermal configuration of the tunnel as food products being cooked pass from one end of the tunnel to the other. For example, raw pizzas entering the inlet to the tunnel constantly change the physical and thermal configuration of the tunnel environment as they advance to the other end, while drawing and emitting ever-varying amounts of heat. As a result, temperatures within the oven can vary greatly from one end of the tunnel to the other.

Currently, the most common technique for controlled heating through the length of the conveyor oven tunnel involves monitoring temperatures near the inlet and outlet ends of the heated tunnel to maintain a predetermined average temperature over the length of the tunnel. Thus, for example, as a cold raw pizza enters the inlet to the tunnel, thereby causing a sudden drop in the tunnel temperature at the inlet, the drop in temperature is sensed, and more heat is supplied to the tunnel to raise the temperature at or near the inlet temperature sensor. Unfortunately, this can also raise the temperature at the outlet of the oven, which causes the temperature sensor at the outlet to trigger a heating reduction to prevent an excessive temperature at or near the tunnel outlet. In this way, temperature sensors near the inlet and outlet of the oven help to achieve controlled heating of the tunnel to generally maintain a target average temperature.

However, controlled and repeatable heating along the length of the heated tunnel (e.g., whether a desired uniform or non-uniform temperature profile along the length of the tunnel) cannot be achieved in this way. Thus, food products traveling through the oven do not experience controlled and repeatable heating which, it has been discovered, makes it necessary to slow the conveyor to a speed which completes the cooking in more time than would be the case if a desired temperature profile could be achieved throughout the length of the heated tunnel. In other words, improved heating control from one end of the tunnel to the other may reduce required cooking times and increase cooking quality.

Additionally, in many applications it is necessary to be able to operate the conveyor oven using either side as the inlet, by running the conveyor belt either from left-to-right for a left side inlet, or from right-to-left for a right side inlet. To be most successful in such interchangeable applications, it is particularly desirable to have greater control over the heating and temperature profile of a conveyor oven along the length of the conveyor oven tunnel.

SUMMARY

Some embodiments of the present invention provide a conveyor oven comprising an oven chamber in which food is cooked; a moveable conveyor configured to convey the food into and out of the oven chamber; a burner assembly configured to emit a flame that generates heat for the oven chamber; a burner tube extending into a burner tube compartment and positioned to receive at least a portion of the flame emitted by the burner assembly; an apertured baffle also extending into the burner tube compartment; and a fan assembly in fluid communication with the burner tube compartment and operable to receive air from the burner tube compartment and direct it to the oven chamber.

In some embodiments, a rifling plate is positioned in the burner tube. The rifling plate can be twisted about an axis extending along the rifling plate. Also, the rifling plate can be connected to a distal end of the burner tube by a pin.

In some embodiments, the fan assembly includes a scroll fan having a housing with an inlet, a first outlet, and a second outlet. Also, a baffle can be positioned in the scroll fan housing to divide air flow from the fan to the first outlet and the second outlet.

In some embodiments, the apertured baffle is positioned in the burner tube compartment opposite the burner tube. Also, the apertured baffle can include a passive tube. The passive tube can include an elongated outer wall and a plurality of apertures extending through the outer wall. In addition, at least a portion of the apertures can be positioned in area adjacent an inlet of the fan assembly.

In some embodiments, a funnel is positioned in front of an open end of the passive tube. Also, a distal end of the passive tube can include a funnel-shaped opening.

In some embodiments, a flame trap is positioned adjacent a distal end of the burner tube and in fluid communication with the burner tube compartment.

Some embodiments of the present invention provide a conveyor oven comprising an oven chamber in which food is cooked; a moveable conveyor configured to convey the food into and out of the oven chamber; a burner assembly configured to emit a flame that generates heat for the oven chamber; a burner tube extending into a burner tube compartment and positioned to receive at least a portion of the flame emitted by the burner assembly; a passive tube also extending into the burner tube compartment and having a funnel-shaped terminal end; and a fan assembly in fluid communication with the burner tube compartment and operable to receive air from the burner tube compartment and direct it to the oven chamber.

In some embodiments, a rifling plate is positioned in the burner tube. The rifling plate can be twisted about an axis extending along the rifling plate. Also, the rifling plate can be connected to a distal end of the burner tube by a pin.

In some embodiments, the fan assembly includes a scroll fan having a housing with an inlet, a first outlet, and a second outlet. Also, a baffle can be positioned in the scroll fan housing to divide air flow from the fan to the first outlet and the second outlet.

In some embodiments, the passive tube is positioned in the burner tube compartment opposite the burner tube. The passive tube can include an elongated outer wall and a plurality of apertures extending through the outer wall. Also, at least a portion of the apertures can be positioned in area adjacent an inlet of the fan assembly.

In some embodiments, a flame trap is positioned adjacent a distal end of the burner tube and in fluid communication with the burner tube compartment.

Some embodiment of the present invention provide a conveyor oven for cooking food, wherein the conveyor oven comprises an oven chamber in which food is cooked; a conveyor moveable to convey the food into and out of the oven chamber; a burner assembly operable to emit a flame to heat air for convection cooking of food moving through the oven chamber on the conveyor; a burner tube extending into a plenum and positioned to receive at least a portion of the flame emitted by the burner assembly; a passive tube in the plenum positioned opposite the burner tube, wherein the passive tube includes an open end opposite and facing the burner tube and an outer wall having a plurality of apertures extending through the outer wall; and a fan assembly in fluid communication with the plenum and operable to deliver heated air from the plenum to the oven chamber for convection cooking of food moving through the oven chamber on the conveyor.

In some embodiments, a burner assembly for a conveyor oven for cooking food is provided, wherein the burner assembly is operable to emit a flame to heat air for convection cooking of food moving through the oven chamber on the conveyor, and wherein the burner assembly includes a burner tube extending into a plenum and positioned to receive at least a portion of the flame emitted by the burner assembly; and a rifling plate extending through the burner tube, wherein the rifling plate is slidingly positioned within the burner tube.

Some embodiments of the present invention provide a conveyor oven for cooking food, wherein the conveyor oven includes an oven chamber in which food is cooked; a conveyor moveable to convey the food into and out of the oven chamber; a burner assembly operable to emit a flame to heat air for convection cooking of food moving through the oven chamber on the conveyor; a burner tube extending into a plenum and positioned to receive at least a portion of the flame emitted by the burner assembly; a rifling plate extending through the burner tube, wherein the rifling plate is slidingly positioned within the burner tube; a passive tube in the plenum positioned opposite the burner tube, wherein the passive tube includes an open end opposite and facing the burner tube and an outer wall having a plurality of apertures extending through the outer wall; and a fan assembly in fluid communication with the plenum and operable to deliver heated air from the plenum to the oven chamber for convection cooking of food moving through the oven chamber on the conveyor.

In some embodiments, a conveyor oven for cooking food is provided, and includes an oven chamber in which food is cooked; a conveyor moveable to convey the food into and out of the oven chamber; a burner assembly operable to emit a flame to heat air for convection cooking of food moving through the oven chamber on the conveyor; a burner tube extending into a plenum and positioned to receive at least a portion of the flame emitted by the burner assembly; a baffle in the plenum positioned opposite the burner tube, wherein the baffle defines a fluid conduit having an entrance into which air heated from the burner tube is received and an exit separate from the entrance and through which air is discharged; and a fan assembly in fluid communication with the plenum and operable to deliver heated air from the plenum to the oven chamber for convection cooking of food moving through the oven chamber on the conveyor.

Other aspects of the invention will become apparent by consideration of the detailed description and accompanying drawings.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION

Figure 1:
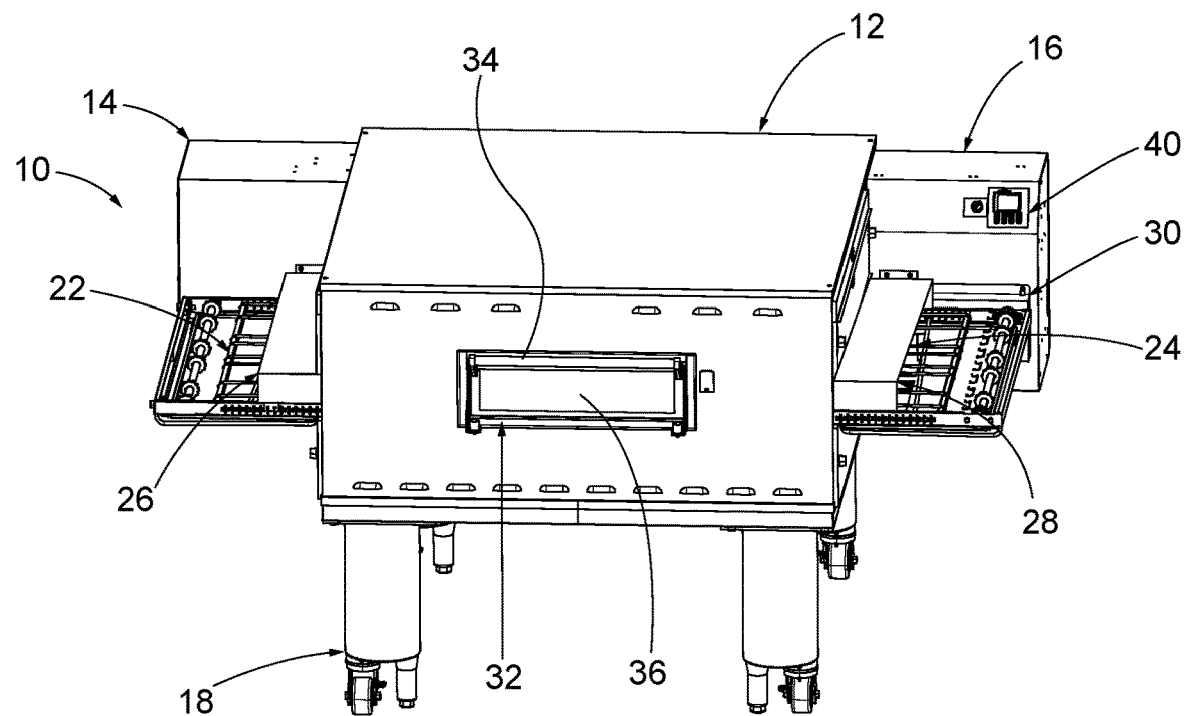
FIG. 1 is a front perspective view of an exemplary conveyor oven according to an embodiment of the present invention.

FIGS. 1-5 shows a conveyor oven 10 having an oven housing 12, a burner housing 14 positioned on a first side of the oven 10, and a control housing 16 positioned on a second side of the oven 10. One or more leg assemblies 18 extend from the bottom of the housing 12. A conveyor 22 runs through a heated tunnel 24 of the oven 10. A raw food product can be placed on the conveyor 22 and moved through the oven 10 to exit as a cooked food product.

Conveyors

The conveyor 22 has a width generally corresponding to the width of the heated tunnel 24, and is designed to travel in a first direction A, from left oven end 26 toward right oven end 28, or alternatively in the opposite direction B, from right oven end 28 toward left oven end 26. Thus, oven ends 26 and 28 may serve respectively as the inlet and outlet of an oven with a rightwardly moving conveyor 22 or as the outlet and inlet of an oven with a leftwardly moving conveyor 22.

The support, tracking and drive of conveyor 22 are achieved using conventional techniques as would be understood by one of ordinary skill in the art. A drive mechanism is housed within a drive compartment 30 connected to the control housing 16. The speed at which the conveyor 22 moves can be coordinated with the temperature in the heated tunnel 24 so that the emerging food product is properly cooked.

Normally, only one conveyor 22 is used, as shown. Certain specialized applications, however, may make two or more conveyors a preferable design. For example, a first conveyor may begin at left oven end 26 and travel at one speed to the center or other location of the oven 10, while a second conveyor beginning at such a location and ending at the right oven end 28 may travel at a different speed. Alternatively, conveyors that are split longitudinally may be used, so that one conveyor carries a product in direction A, while the other conveyor carries a product in direction B, or so that two side-by-side conveyors carry product in parallel paths and in the same direction (A or B) through the oven 20. This enables one product to travel on the conveyor 22 at one speed to cook one kind of product and the other conveyor to travel on the other conveyor at a different speed to cook another kind of product. In addition, three or more side-by-side conveyors can carry product in parallel paths through the oven 10.

Auxiliary Door

Figure 2:
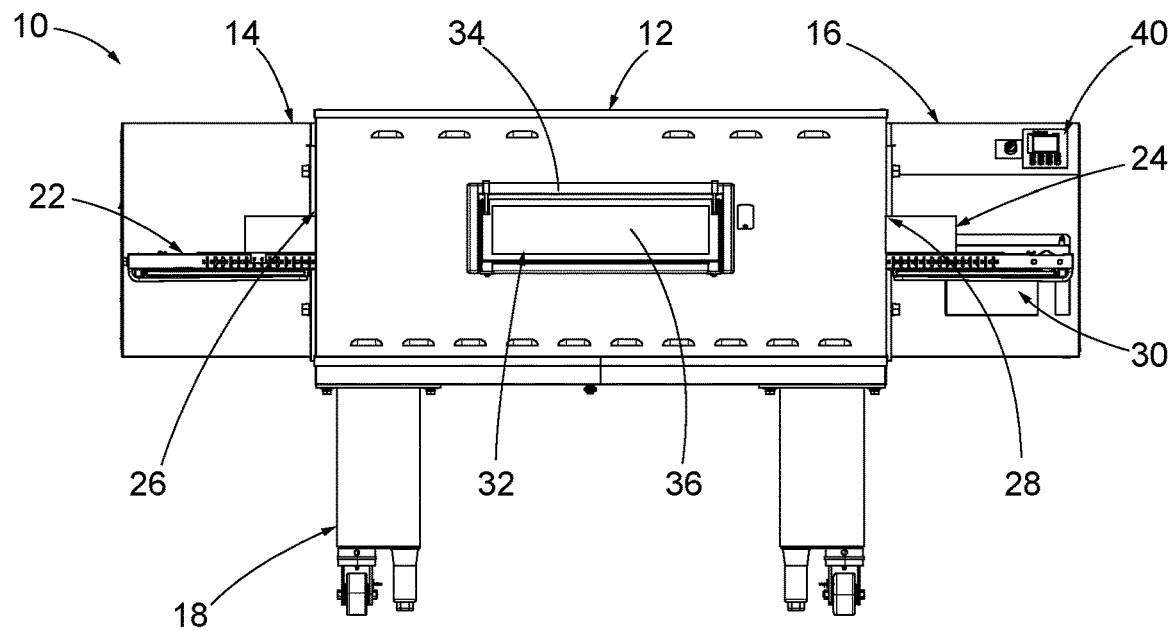
FIG. 2 is a front view of the conveyor oven of FIG. 1.
Figure 3:
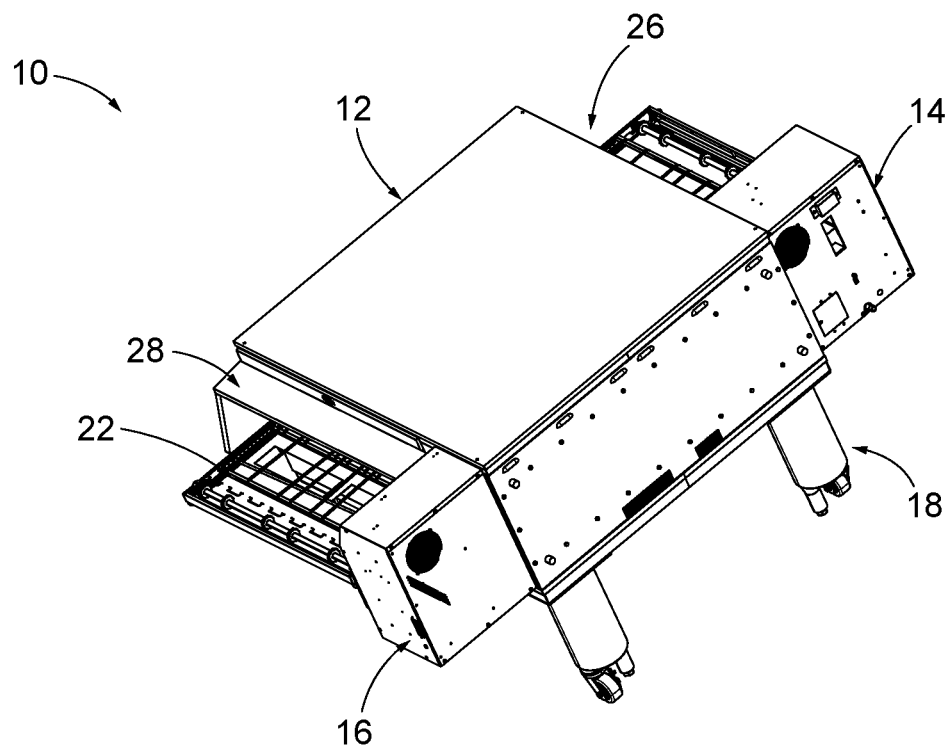
FIG. 3 is a rear perspective view of the conveyor oven of FIG. 1.
Figure 4:
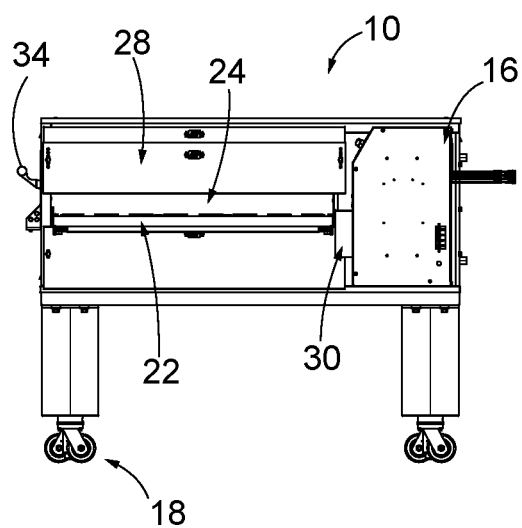
FIG. 4 is a right side view of the conveyor oven of FIG. 1.
Figure 5:
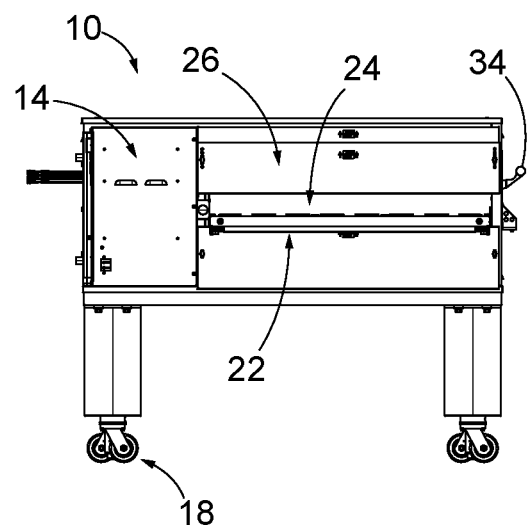
FIG. 5 is a left side view of the conveyor oven of FIG. 1.

FIGS. 1 and 2 best show a hinged door 32 provided on the front of the oven 10 and having a handle 34 and a heat resistant glass panel 36 so that a person operating the oven can view food product as it travels through the oven 10. A stainless steel metal frame surrounds the oven opening and provides a support for a gasket of suitable material (not shown), so that when the door 32 is in its closed position, the door 32 fits against and compresses the gasket to retain heat in the oven 10. An operator may open the door 32 by pulling on handle 34 to place a different product on the conveyor 22 if less than a full cooking cycle is required to produce a fully cooked product.

Oven Controls

Figure 6:
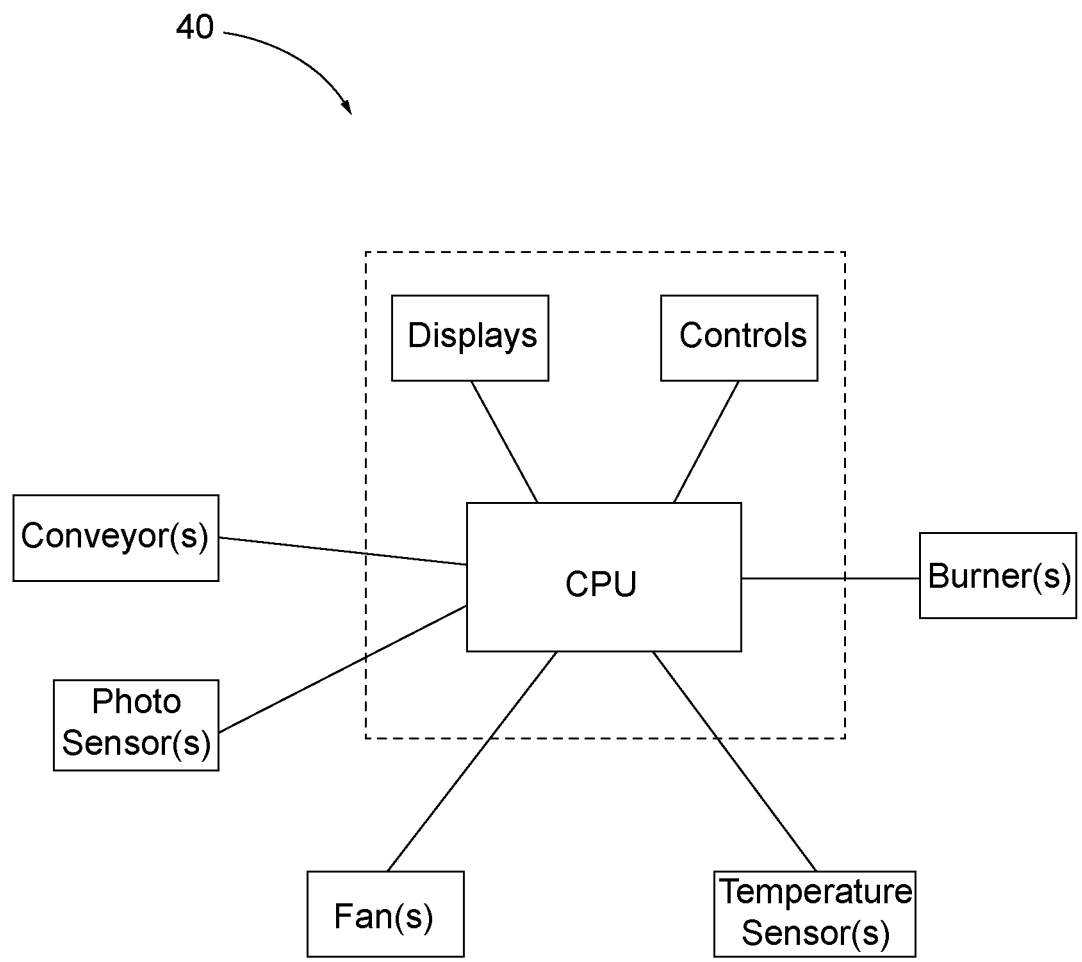
FIG. 6 is a schematic view of an exemplary control assembly for the conveyor oven of FIG. 1.

The control housing 16 contains a control assembly 40 for the oven 10. FIG. 6 shows a schematic illustration of the control system for the oven 10. A microprocessor-based controller can be used, and can include a central processing unit ("CPU"), one or more displays, and a control interface. The CPU can control a plurality of devices including one or more burners (including one or more blower switches, ignition switches and blowers, fuel valves, and flame sensing elements), one or more fans, and one or more conveyors 22. The CPU may also receive input from a plurality of sensors including one or more temperature sensors and one or more photo sensors.

The oven controls can include a controller (such as a Honeywell UDC 3300 controller) which may be programmed to control and monitor the cooking process by pressing appropriate set-up and display buttons while viewing an alphanumeric display, which will display process variables and setpoints including oven temperature, hot air blower speed, etc. A "heat on" indicator can be illuminated when a minimum threshold heat output is generated by the oven 10 under control of the controller. The present temperature and/or a programmed setpoint temperature may be displayed. By simultaneously pressing selected keys, the value of the heat output with the heat on indicator in the "on" condition can be displayed. Also, the controller can be configured to enable a user to cycle through actual temperature display indicators to reveal actual temperature(s), setpoint temperature(s), and the heat on condition. In the illustrated embodiment, the speed and direction of the conveyor 22 can be set using the controller.

Heat Delivery System

Figure 7:
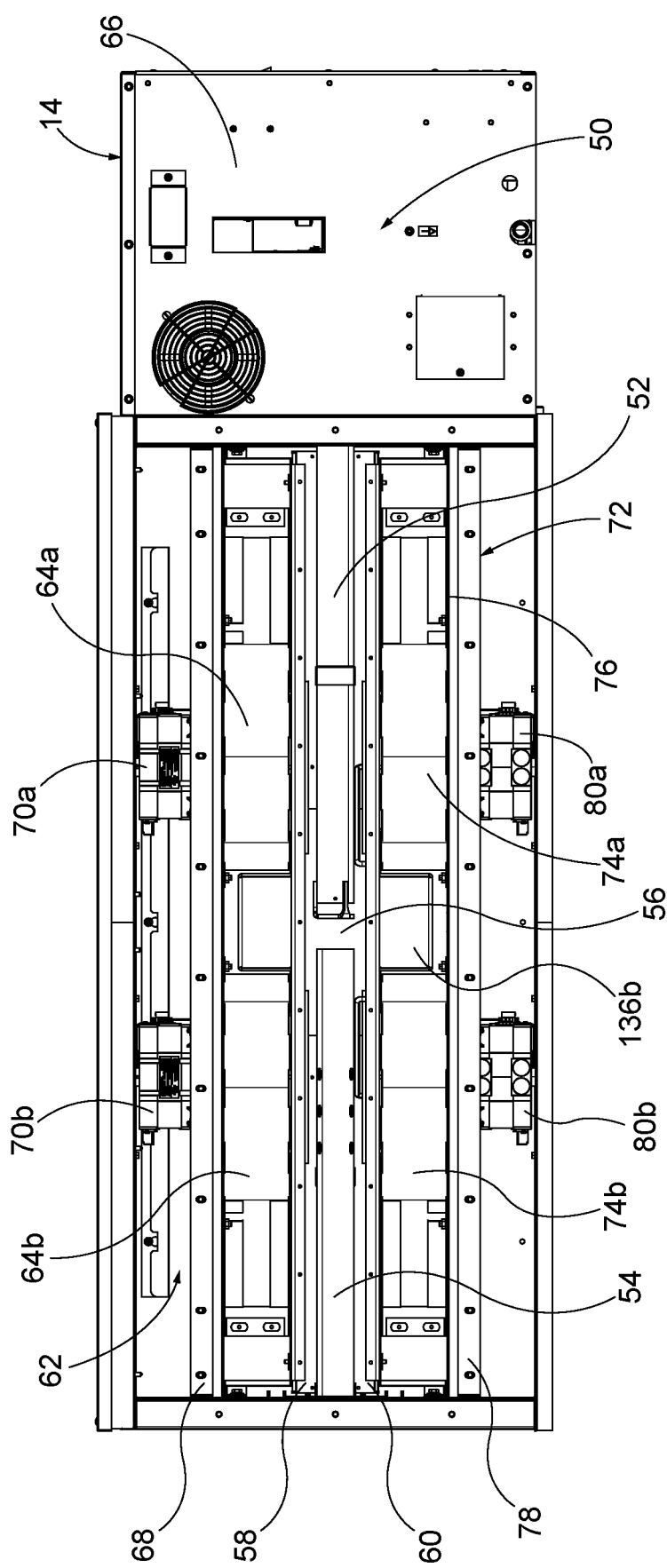
FIG. 7 is a rear view of an exemplary heat distribution assembly used in the conveyor oven of FIG. 1.

FIG. 7 shows exemplary components involved with the heat delivery system for the oven 10, which is configured to provide convection heating to the tunnel 24 and food products traveling therethrough. The illustrated heat delivery system includes a burner assembly 50 positioned in the burner housing 14. The burner assembly 50 is configured to supply heat through a set of burner tubes 52 which extend into the oven parallel to the tunnel 24. A baffle assembly is positioned opposite the burner tubes 52. In this embodiment, the baffle assembly includes a set of passive tubes 54. The burner tubes 52 and the passive tubes 54 are positioned in a burner tube compartment 56 at least partially defined by a first upper shelf 58 and a first lower shelf 60. By utilizing a burner assembly 50 and associated burner tubes 52 on only one side of the conveyor oven 10 as shown (e.g., on an upstream end of the conveyor oven 10) and using passive tubes 54 on the other side of the conveyor oven 10, gas lines, electrical lines, and related hookups are only needed on one side of the conveyor oven 10. This can significantly reduce the cost and complexity of manufacturing, servicing, and installing the conveyor oven 10.

An upper fan assembly 62 includes a first fan 64A and a second fan 64B positioned in an upper chamber 66 above the burner tube compartment 56. The upper chamber 66 is at least partially defined by the first upper shelf 58 and a second upper shelf 68. A first motor 70A and a second motor 70B are connected to the second upper shelf 68, and drive the first and second fans 64A, 64B, respectively.

A lower fan assembly 72 includes a third fan 74A and a fourth fan 74B positioned in a lower chamber 76 below the burner tube compartment 56. The lower chamber 76 is at least partially defined by the first lower shelf 60 and a second lower shelf 78. A third motor 80A and a fourth motor 80B are connected to the second lower shelf 78 and drive the third and fourth fans 74A, 74B, respectively.

In some embodiments, controlled desired heating and temperature profiles from one end of the tunnel 24 to the other is achieved by apportioning the tunnel 24 into two or more segments, and by providing independent temperature sensing and independent delivery of heated air to each segment. For example, the first fan 64A and the third fan 74A can be controlled to deliver heated air to a first oven segment, and the second fan 64B and the fourth fan 74B can be controlled to deliver heated air to a second oven segment. In some embodiments, the first fan 64A and the third fan 74A are dependently controlled (that is, have the same duty cycle and/or fan speeds) to provide controlled heat to the first tunnel segment. Similarly, the second fan 64B and the fourth fan 74B can be dependently controlled (that is, have the same duty cycle and/or fan speeds) to provide controlled heat to the second tunnel segment. In other embodiments, the first and second fans 64A, 64B are dependently controlled (that is, have the same duty cycle and/or fan speeds) to provide controlled heat to upper areas of the tunnel 24, such as to areas of the tunnel 24 above the conveyor 22. Similarly, the third and fourth fans 74A, 74B can be dependently controlled (that is, have the same duty cycle and/or fan speeds) to provide controlled heat to lower areas of the tunnel 24, such as to areas of the tunnel 24 below the conveyor 22. In some embodiments, each of the fans 64A, 64B, 74A, 74B can be independently controlled for both duty cycle and/or fan speed.

Control of the fans 64A, 64B, 74A, 74B can be based at least in part upon one or more temperatures sensed within the oven 10 (such as a temperature sensor positioned within each fan housing downstream of the fan impeller, temperature sensors located in or adjacent the tunnel 24 to detect the temperature of air at different locations in the tunnel, temperature sensors mounted near the left end 26 of the oven tunnel, the right end 28 of the oven tunnel, or at other points therebetween, or temperature sensors positioned in the burner tube compartment 56 or at other points along the airflow path), one or more detected or calculated positions of food products within, entering, or exiting the oven 10, and/or the passage of one or more predetermined periods of time. In that regard, one or more position sensors (not shown) can be located to detect the position of food product on the conveyor 22 in place of or in addition to any of the above-mentioned temperature sensors, and can thereby control one or more operations of the oven 10 as a result of such position detection.

To provide control over fan speed based upon any of these factors, the motors 70A, 70B, 80A, 80B can be operatively connected to and controlled by the control assembly 40. In some embodiments, the fans 64A, 64B, 74A, 74B are driven by variable-speed motors 70A, 70B, 80A, 80B coupled to and controlled by the control assembly 40. Power can be supplied to each variable-speed motor 70A, 70B, 80A, 80B by, for example, respective inverters (not shown). In some embodiments, each inverter is a variable-speed inverter supplying power to the motor 70A, 70B, 80A, 80B at a frequency that is adjustable to control the speed of the motor 70A, 70B, 80A, 80B and, therefore, the speed of the fans 64A, 64B, 74A, 74B. An example of such an inverter is inverter Model No. MD60 manufactured by Reliance Electric (Rockwell Automation, Inc.).

In some embodiments, the first tunnel segment can extend from the left oven end 26 substantially to a midpoint of the tunnel 24, whereas the second tunnel segment can extend from the first tunnel segment to the right oven end 28. The temperatures in each tunnel segment can be monitored by temperature sensors as described above (e.g., thermocouples or other temperature sensing elements, not shown). Furthermore, in those embodiments in which the oven 10 is heated by one or more gas burners, one or more gas output sensors (not shown) can be positioned to detect the amount of fuel supplied to the oven 10. This information can be provided to the control assembly 40 in order to control one or more operations of the oven 10, such as to turn the conveyor 22 and/or fans 64A, 64B, 74A, 74B on or off, and/or to adjust the speed of the conveyor 22 and/or fans 64A, 64B, 74A, 74B.

During operation, air in the burner tube compartment 56 is heated by the burner tubes 52. The upper and lower fan assemblies 62, 72 draw air through the burner tube compartment 56 and direct it to the tunnel 24. In certain embodiments, burner tubes 52 positioned on a single side of the burner tube compartment 56 are sufficient for supplying heat to the tunnel 24. While this saves energy, having an open space in the remainder of the burner tube compartment 56 can create a pressure differential which can result in an undesirable temperature difference between the tunnel segments, and therefore uneven heating. The baffle (passive tubes, in the illustrated embodiment) can be positioned in the burner tube compartment 56 opposite the burner tubes 52 to help reduce or eliminate the pressure differential, and allow for greater control over airflow and temperature across the oven 10.

Burner Assembly

Figure 8:
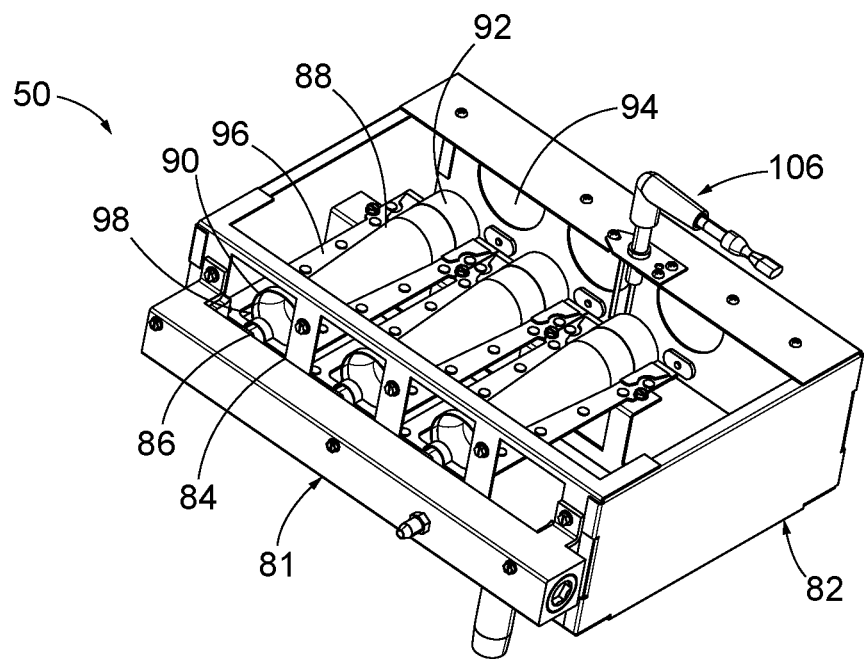
FIG. 8 is a top perspective view of exemplary burner assembly components used in the heat distribution assembly of FIG. 7.
Figure 12:
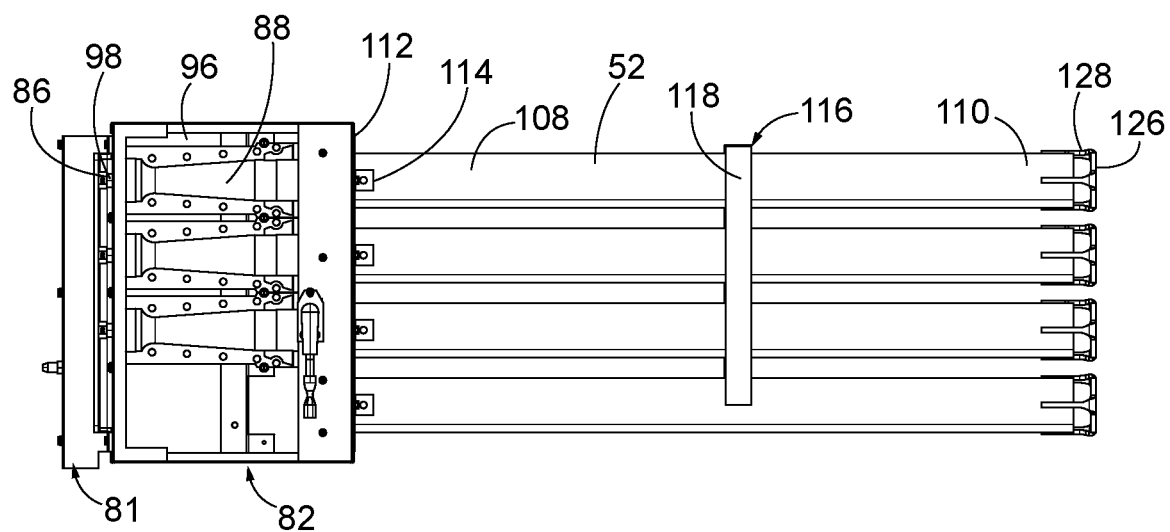
FIG. 12 is a top view of some of the burner assembly components from FIG. 8, shown with exemplary burner tubes.
Figure 13:
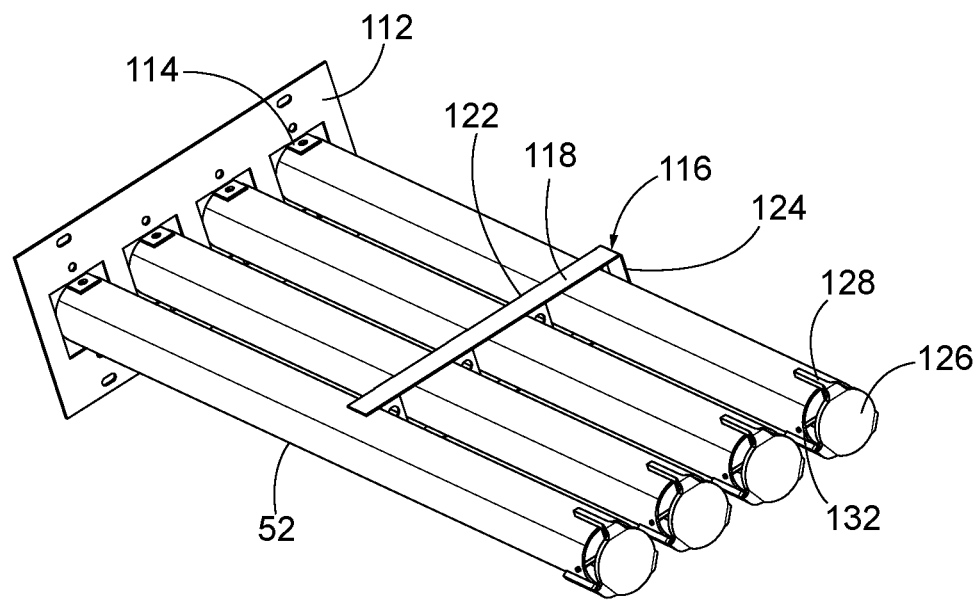
FIG. 13 is a front perspective view of the burner tubes shown in FIG. 12.

A burner assembly 50 is positioned in the burner housing 14 adjacent the burner tubes 52. FIG. 8 shows a portion of an exemplary embodiment of the burner assembly 50 having a gas supply manifold 81 extending into a venturi housing 82. Other components can be associated with the burner assembly 50 depending on the required heat output and control components, as would be understood by one of ordinary skill in the art. The top of the venturi housing 82 has been removed in FIG. 8 to show the components therein. The illustrated venturi housing 82 has a set of inlet openings 84 in communication with the gas supply manifold 81, and through which a series of nozzles 86 provides gas to the venturi tubes 88. In the illustrated embodiment, the nozzles 86 are spaced from the venturi tubes 88 to allow air to mix with the gas prior to ignition. The amount of gas supplied by the nozzles 86 can be controlled to adjust the heat output of the burner assembly 50. Each of the venturi tubes 88 of the illustrated embodiment has a proximal end 90 facing a respective nozzle 86, and a distal end 82 facing a set of outlet openings 94 of the venturi housing 82. Also with reference to the illustrated embodiment, the outlet openings 94 are aligned with respective burner tubes 52, as best shown in FIG. 12.

Figure 9:
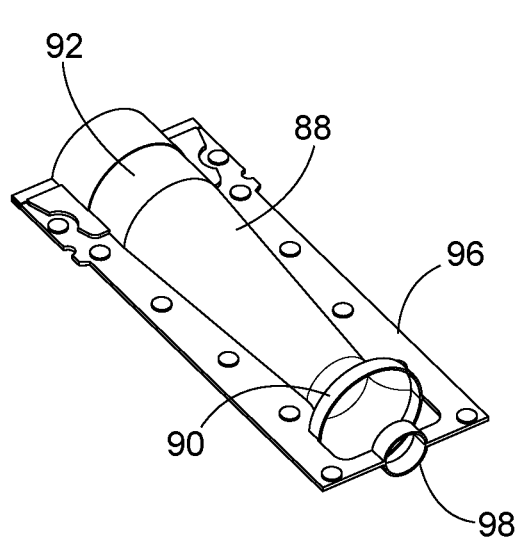
FIG. 9 is a rear perspective view of an exemplary venturi tube of the burner assembly of FIG. 8.
Figure 10:
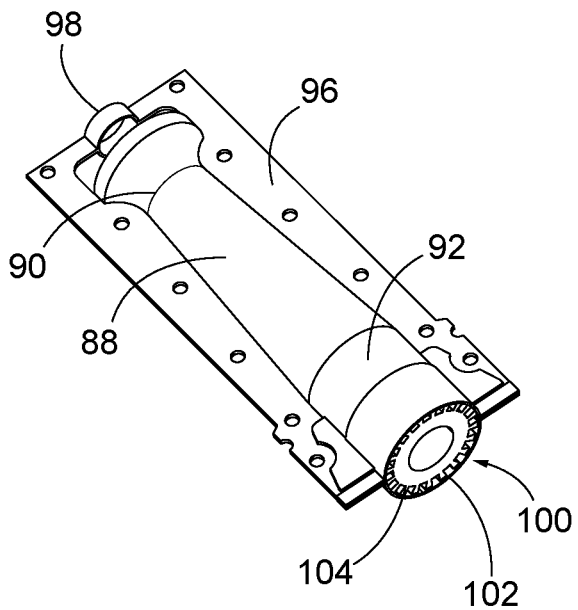
FIG. 10 is a front perspective view of the venturi tube of FIG. 9.
Figure 11:
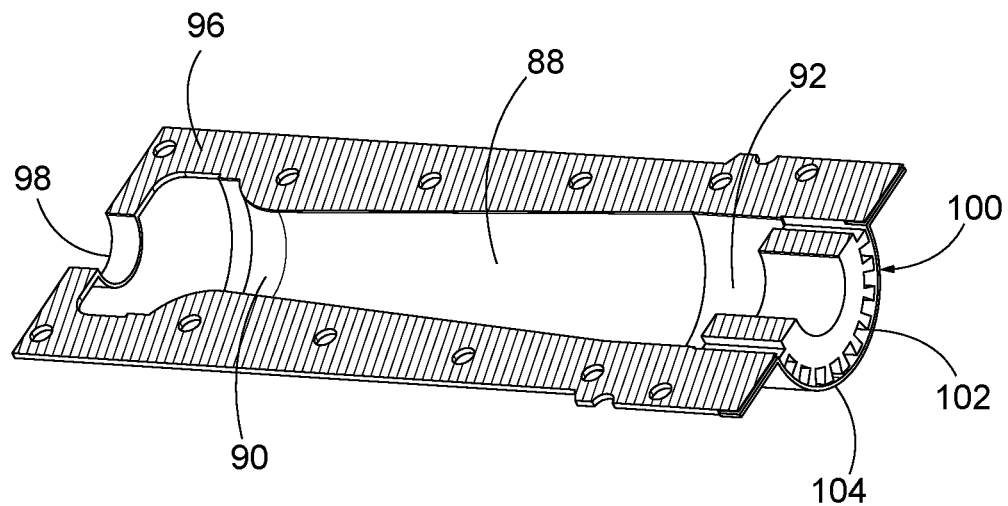
FIG. 11 is a sectional view of the venturi tube of FIG. 10.

FIGS. 9-11 show an exemplary embodiment of a venturi tube 88. In the illustrated embodiment, the venturi tube has an outer flange 96 extending from an outer wall of the venturi tube 88. The outer flange 96 can include a ring 98 that receives a gas supply nozzle 86 (described above). The flange 96 can be used to connect the venturi tube 88 to the venturi housing 82. For example, the flange 96 can be connected to a bracket or other structure associated with the venturi housing 82 using one or more fasteners. The venturi tube 88 can also be connected through a joining process, such as spot welding, or in any other suitable manner.

In some embodiments, each venturi tube 88 has a flame retention member 100 which can help prevent lift-off of flame from the distal end 92 of the venturi tube 88. FIGS. 10 and 11 show an exemplary embodiment of a flame retention member 100 comprising an inner ring 102 spaced from the inside diameter of the venturi tube 88, thereby defining an annular space between the ring 102 and the inside diameter of the venturi tube 88. The ring 102 can be permanently or releasably retained in place with respect to the venturi tube 88 in a number of different manners, such as by one or more fingers, pins, clips, or other fasteners, by an apertured disc, and the like. In the illustrated embodiment, the ring 102 is retained in place by a plurality of crenelated projections 104 extending from the ring 102 and abutting the inside diameter of venturi tube 88. Also with reference to the illustrated embodiment, the ring 102 is held in place by a friction fit between the projections 104 and the venturi tube 88 and/or between the projections 104 and the ring 102. The projections 104 can be unitarily formed with the ring 102, or formed as a separate member. The ring 102 and projections 104 can also be integrally formed, for example through one or more molding or casting procedures with the venturi tube 88. Different sizes, shapes, and configurations of the projections 104 and the ring 102 can be used.

Ignition of an gas/air mixture exiting the venturi tubes 88 can be accomplished in a number of ways. FIG. 8 shows an exemplary embodiment in which a single igniter 106 is positioned in front of one of the venturi tubes 88. The illustrated igniter 106 is electrically powered and capable of producing a spark that ignites the gas/air mixture stream exiting one or more of the venturi tubes 88. In some embodiments, once one of the streams from the venturi tube 88 has been lit, the flame produced can cross over to ignite the remaining streams. In other exemplary embodiments, an igniter can be positioned in front of each venturi tube 88. The burner assembly 50 can be provided with a flame or heat sensor as a fail-safe measure to shut off the gas supply should any of the streams fail to ignite. In some embodiments, each venturi tube 88 is provided with a respective sensor that can trigger gas shut-off when no flame is detected from the corresponding venturi tube, such as after a sufficient period of gas supply time has elapsed.

As best shown in FIG. 12, each of the illustrated venturi tubes 88 is aligned with a burner tube 52. The resulting flame produced by each venturi tube 88 is configured to extend at least partially into the aligned burner tube 88. In the illustrated embodiment, three venturi tubes 88 are used with four burner tubes 52. The burner tube 52 not associated with a venturi tube 88 can act as a passive tube or baffle to normalize air flow through the burner tube compartment 56. If a greater heat output is needed for the oven 10, a burner assembly having four venturi tubes 88 and four nozzles 86 can be substituted and used with the burner tubes 52 already in place. Other embodiments can include fewer or more venturi tubes 88 and burner tubes 52, and also different ratios of venturi tubes 88 to burner tubes 52 as needed to create a desired heat output.

Burner Tubes

Figure 17:
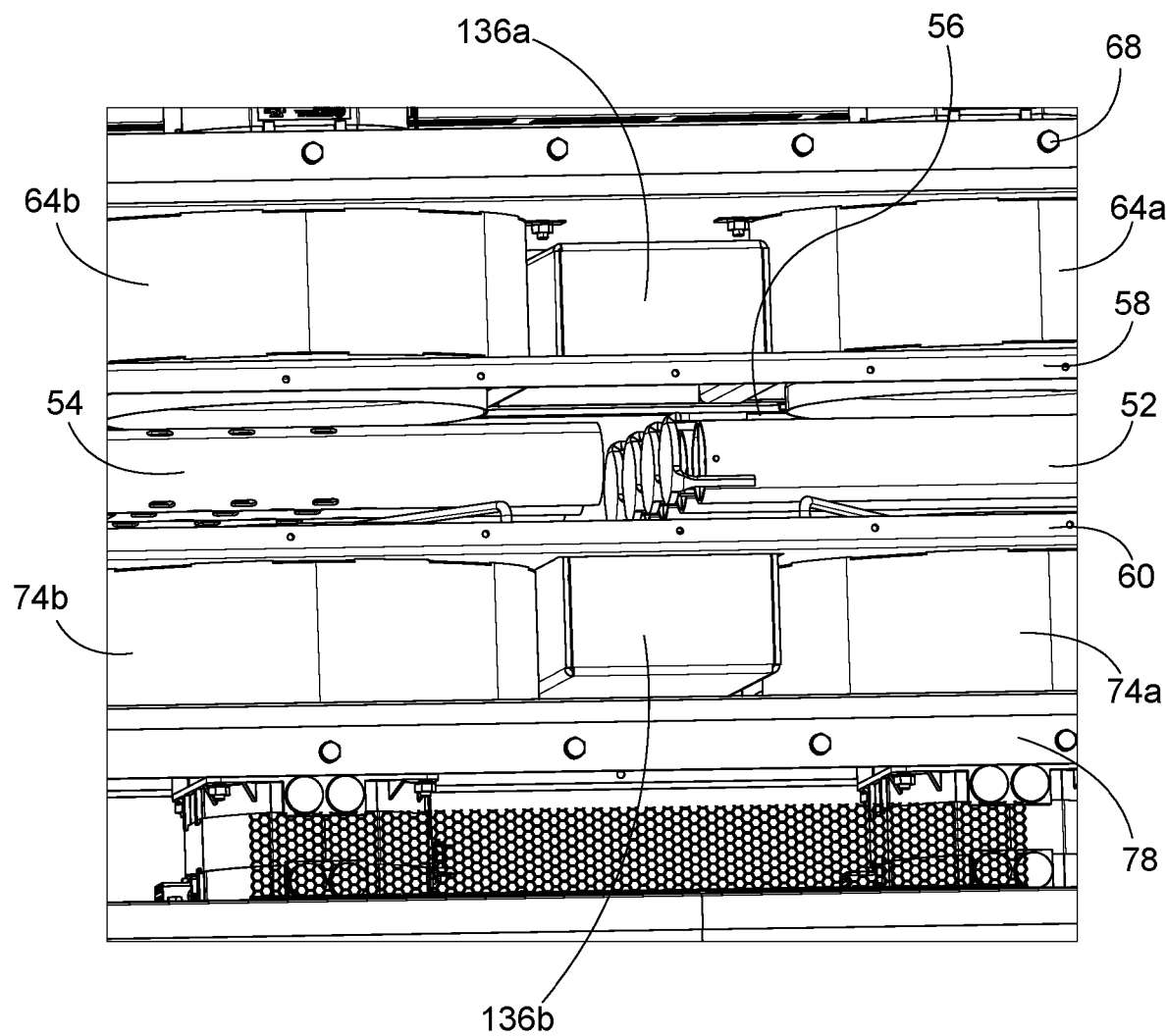
FIG. 17 is a partial view of the heat distribution assembly shown in FIG. 7.

FIGS. 12-15 show an exemplary set of four burner tubes 52 with each tube having a proximal end 108 facing the burner assembly 50 and a distal end 110 positioned in the burner tube compartment 56 (see FIG. 7). The illustrated burner tubes 52 are connected together and to the venturi housing 82 of the burner assembly 50 at the proximal end 108 by a mounting bracket 112. The mounting bracket 112 can have a substantially rectangular configuration, such as that shown in FIGS. 12-15, with an opening for receiving each burner tube 52. A tab 114 can extend from the top and bottom of each opening to facilitate a joining connection between the tubes 52 and the mounting bracket 112, for example a welded connection. Other connections between the burner tubes 52 and the mounting bracket 112 (e.g., fasteners, welding, and the like) can also or instead be used. In some embodiments, a second bracket 116 can be positioned between the proximal and distal ends 108, 110 of the burner tubes 52 to help stabilize the burner tubes 52. In the illustrated embodiment, the second bracket 116 includes an upper bar 118 connected to the tops of the burner tubes 52, a lower bar 120 connected to the bottoms of the burner tubes 52, side bars 122 extending between each burner tube 52, and at least one outer bar 124 positioned outside of at least one of the end burner tubes 52. The mounting bracket 112 can be configured to be removably connected to the side of the oven 10, for example using fasteners, as shown in FIG. 17. In such embodiments, with the mounting bracket 112 disconnected, the entire burner tube assembly can be removed from the oven 10 as a single unit.

In some embodiments, a target 126 is positioned opposite (and can be spaced from) the distal end 110 of each burner tube 52. In certain instances, flame from the burner assembly 50 can travel through the burner tube 52, in which case the target 126 can help to disperse the flame as it leaves the tube 52. The target 126 can be retained in this position with respect to the burner tube 52 in any manner, including through welding or any other suitable joining process, fasteners, and the like. In the illustrated embodiment, the target 126 is held in place by arms 128 extending from the target 126 to the surface of the burner tube 52. The arms 128 can be permanently or releasably attached to the outer tube 52 and/or to the target 126 in any suitable manner, such as by welding, brazing, or riveting, by one or more snap-fits or other inter-engaging element connections, by clips, clamps, screws, or other fasteners, and the like. The illustrated target 126 has a substantially flat disc shape, although other shapes can be used, including a convex shape with an apex extending generally toward the distal end 110 of the burner tube 52.

Figure 14:
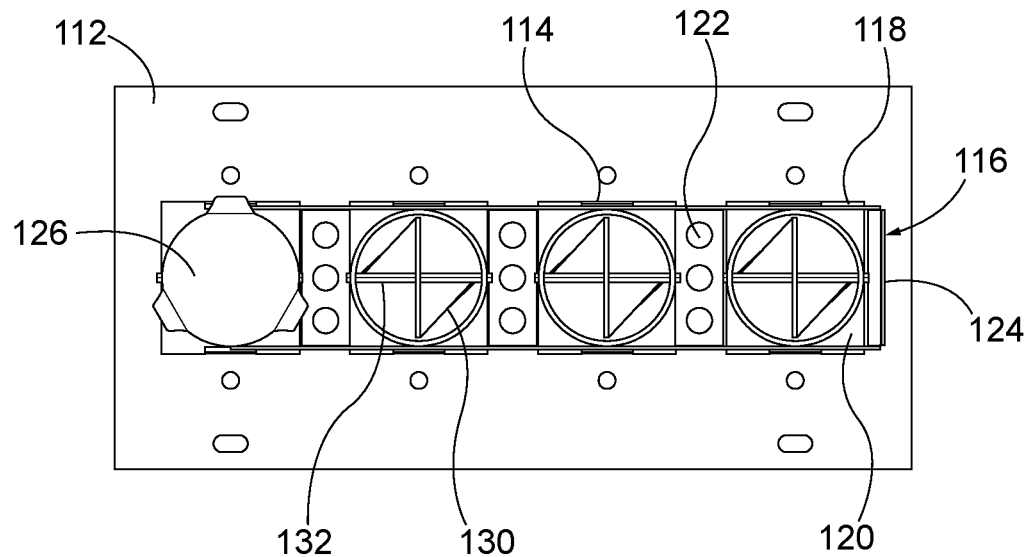
FIG. 14 is a front view of the burner tubes of FIG. 13, shown with three of the targets removed.
Figure 15:
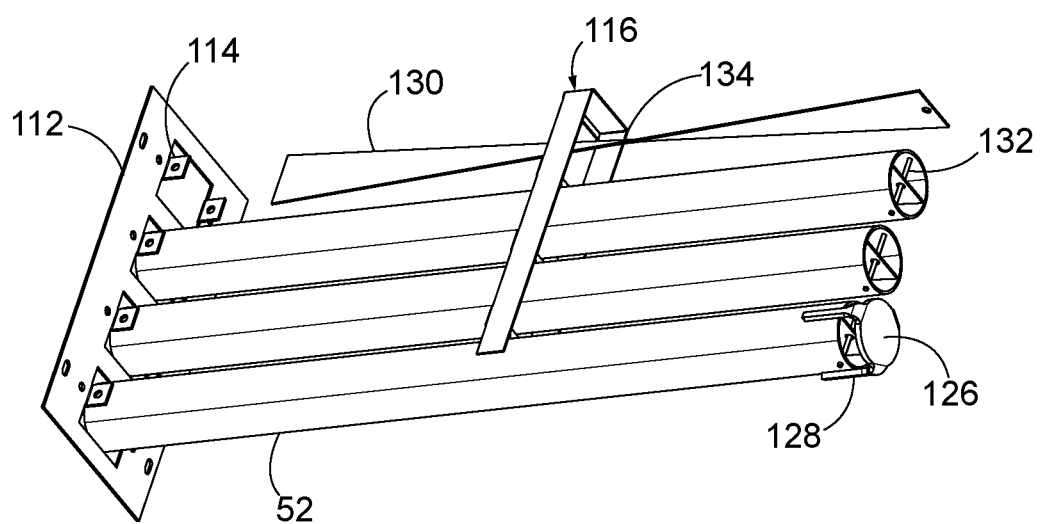
FIG. 15 is a top perspective view of the burner tubes of FIG. 14, shown with one of the burner tubes removed.

In certain embodiments, a rifling plate 130 extends through the inside of the burner tube 52 as shown in FIGS. 14 and 15. The rifling plate 130 is twisted about a longitudinal axis. FIG. 15 illustrates the outer tube hidden to show the configuration of the rifling plate 130 as it extends through the tube. The rifling plate 130 includes a single full rotation about a central point 134. In other embodiments, the rifling plate 130 can include additional full rotations. Each rifling plate 130 can extend along the entire length or any portion of the entire length of the burner tube 52. For example, FIG. 15 shows an exemplary embodiment in which the rifling plate 130 does not extend fully to the opening in the proximal end 108 in the burner tube 52. The rifling plate 130 can improve gas and air to mix within the burner tube 52 for more complete gas combustion, and in some embodiments can improve the quality of the flame generated within the burner tube 52.

In some instances, the length of the rifling plate 130 can vary significantly at different states of the burner assembly 50 based upon the temperature of the rifling plate 130. For example, when the burner assembly 50 is off and no flames are sustained, the rifling plate 130 can have a relatively short length compared to when the burner assembly 50 is on and the rifling plates 130 are heated significantly by flames in the burner tubes 52. As the rifling plates 130 heat up, they can extend in length to the point where they extend out of the distal ends 110 of the burner tubes 52 and even into contact with the targets 126. Such contact can damage the rifling plates 130 or the connections of the rifling plates 130 to the burner tubes 52. In the illustrated embodiment, a fastener (e.g., pin 132) extends through an opening in a distal end of the rifling plate 132, and is connected to the distal end 110 of the burner tube 52. The pin 132 can extend through the opposite sides of the burner tube 52 and/or be connected through a joining process or additional fasteners. By virtue of a such a connection in which the distal end of the rifling plate 132 is attached to the distal end of the burner tube 52 (and in some cases, via a pin or fastener extending through or integral with the distal end of the rifling plate 130), the rifling plate 130 is permitted to lengthen and shorten at different temperatures without damage to the rifling plate 130 or the rifling plate 130 mounting connection(s). In some embodiments, the rifling plate 130 expands (lengthens) in the direction of the burner assembly 50 by virtue of the connection between the rifling plate 130 and the distal end 100 of the burner tube 52.

Figure 16:
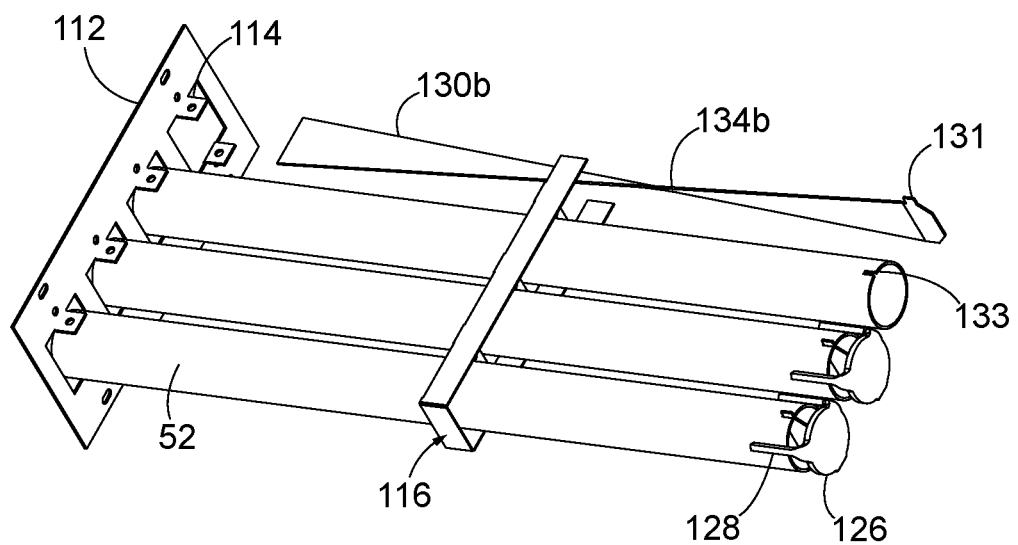
FIG. 16 is a top perspective view of an alternative embodiment of the burner tubes and rifling plates of FIG. 15.

FIG. 16 shows an alternative embodiment of a set of rifling plates 130B extending through a set of burner tubes 52. The rifling plate 130B includes a 90° rotation about a central point 134B. In other embodiments, the rifling plate 130B can include one or more full rotations, or any amount less than one full rotation. Each rifling plate 130B can extend along the entire length or any portion of the entire length of the burner tube 52. FIG. 16 shows an exemplary embodiment in which the rifling plate 130B does not extend fully to the opening in the proximal end 108 in the burner tube 52. This helps prevent the rifling plate 130B from expanding and interfering with the burner assembly 50.

Instead of the pin 132 connection shown in FIG. 15, the rifling plate 130B of FIG. 16 includes a projection 131 extending from the main body of the plate in the radial direction relative to the tube. The projection 131 is located at or near the distal end of the rifling plate 130B. As shown in the exemplary embodiment, the end of the rifling plate 130B extends past the projection 131 and includes a pair of chamfered edges. A slot 133 is formed in the top of the burner tube 52 to receive the projection 131. During expansion of the rifling plate 130B, the projection 131 can move axially in the slot 133, reducing the stress applied to the burner tube 52. In some embodiments, the distance between the distal end of the rifling plate 130B and the target 126 is less than the length of the slot 133 so that the projection 131 will not disengage the slot 133 if the rifling plate 130B expands to the point where the rifling plate 130B contacts the target 126. The chamfered end of the rifling plate 130B reduces interference of airflow through the burner tube 52, including in cases where the rifling plate 130B has expanded to the point where the rifling plate 130B contacts the target 126. Although shown at the top, the projection 131 and the slot 133 can be at any radial position on the burner tube 52. Also, more than one projection 131 and slot 133 can also be used.

Instead of the pin 132 connection shown in FIG. 15, the rifling plate 130B includes an ear 131 extending from the main body of the plate in the radial direction relative to the tube. The ear 131 is placed at or near the distal end of the rifling plate 130B. A slot 133 is formed in the top of the burner tube 52 to receive the ear 131. During expansion of the rifling plate 130B, the ear 131 can move axially in the slot 133, reducing the stress applied to the burner tube 52. Although shown at the top, the slot can be at any radial position on the burner tube 52.

Flame Traps

Figure 18:
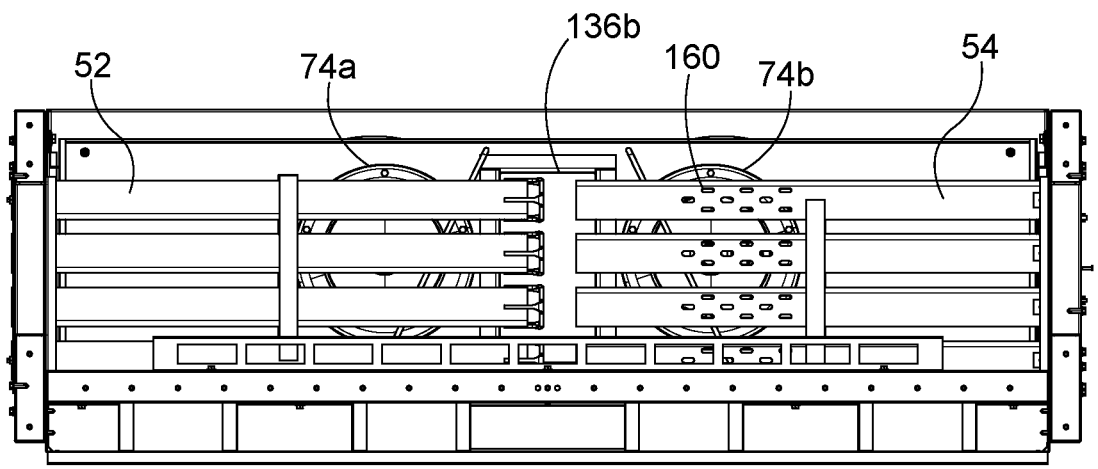
FIG. 18 is a top view of the heat distribution assembly of FIG. 7, shown with the upper fan assembly removed.

FIGS. 17 and 18 show the burner tubes 52 and the passive tubes 54 connected to respective sides of the oven 10 and extending into the burner tube compartment 56. As mentioned above, it is possible under certain circumstances for the flame from the burner assembly 50 to travel through the burner tubes 52. In extreme cases, the flame can enter the burner tube compartment 56 and be drawn into one or more of the fans 64A, 64B, 74A, 74B. To prevent this from happening, one or more flame traps can be positioned in the burner tube compartment 56 or in fluid communication with the burner tube compartment 56. Such traps define receptacles positioned in such a manner as to receive the flame extending out of an adjacent burner tube 52.

In the illustrated embodiment by way of example, an upper flame trap 136A is positioned between the first fan 64A and the second fan 64B, and a lower flame trap 136B is positioned between the third fan 74A and the fourth fan 74B. The upper flame trap 136A extends through the first upper shelf 58, and the lower flame trap 136B extends through the first lower shelf 60, although other flame trap positions and mounting configurations can be used as desired. In various exemplary embodiments, such as the illustrated embodiment, the upper and lower flame traps 136A, 136B each include a receptacle having a plurality of side walls, a base, and an opening in communication with the burner tube compartment 56. If flames exit the burner tubes 52, they will enter the flame traps 136A, 136B, preventing them from traveling along the exterior of the burner tubes 52 or the passive tubes 54 and into one of the fans 64A, 64B, 74A, 74B. Additional structure can be provided that helps the flame traps 136A, 136B to disburse, deflect, or otherwise alter the path of a flame exiting the burner tubes 52. For example, different screens or baffles can be provided inside of, or extending from, the flame traps 136A, 136B.

Passive Tubes

Figure 19:
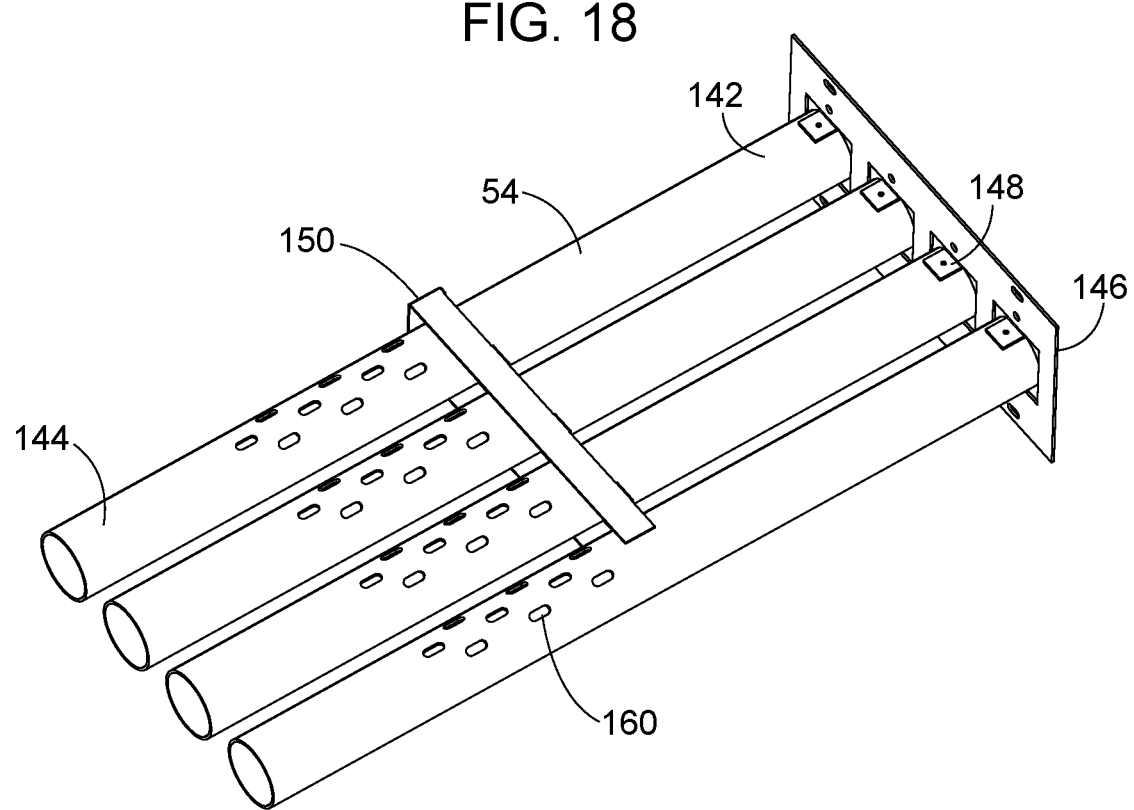
FIG. 19 is a top perspective view of the passive tube assembly from the heat distribution assembly of FIG. 7.

FIG. 19 shows an exemplary set of four passive tubes 54, with each passive tube 54 having a proximal end 142 and a distal end 144. The passive tubes 54 can be connected at the proximal end 142 in any suitable manner, such as by a mounting bracket 146 as shown. The illustrated mounting bracket 146 has a substantially rectangular configuration with an opening for receiving each passive tube 54, although other mounting bracket shapes and sizes can instead be used. A tab 148 can extend from the top and bottom of each opening to facilitate a joining connection between the passive tubes 54 and the mounting bracket 146, for example a welded connection. Other connections between the passive tubes 54 and the mounting bracket 146 (e.g., fasteners, welding, and the like) can also or instead be used. In some embodiments, a second bracket 150 can be positioned between the distal and proximal ends 142, 144 of the passive tubes 54 to help stabilize the passive tubes 54. In the illustrated embodiment, the second bracket 150 includes an upper bar connected to the tops of the passive tubes 54, a lower bar connected to the bottoms of the passive tubes 54, side bars extending between each passive tubes 54, and at least one outer bar positioned outside of at least one of the end passive tubes 54. The mounting bracket 146 is configured to be removably connected to the side of the oven 10, for example using fasteners, as shown in FIG. 17. With the mounting bracket 146 disconnected, the entire passive tube assembly can be removed from the oven 10 as a single unit.

As discussed above, the passive tubes 54 are used as a baffle assembly to help regulate air pressure in the burner tube compartment 56, particularly in the location of the burner tube compartment 56 opposite the burner tubes 52. The space occupied by the passive tubes 54 creates a pressure profile in that portion of the burner tube compartment 56 that can promote a more even distribution of heated air to the fans 64A, 64B, 74A, 74B, and therefore a more controlled and repeatable temperature profile within the tunnel 24 of the oven 10.

With reference now to FIGS. 18-21, in some embodiments a plurality of openings 160 are provided in one or more of the passive tubes 54 to help facilitate the passage of heated air to one or more of the fans 64A, 64B, 74A, 74B (i.e., to fans 64B, 74B in the illustrated embodiment). The openings 160 in the illustrated embodiment have an obround configuration, and are located between the second bracket 150 and the distal end 144 of each passive tube 54. In other embodiments, however, the openings 160 can have any other shape or combination of shapes promoting the passage of air through the walls of the passive tubes 54, such as rectangular, round, or irregularly-shaped openings, slits, a grid of openings, and the like. Also, in other embodiments, the openings 160 can be located along other lengths of the passive tubes 54, such as openings 160 located in the passive tubes 54 from the distal ends 144 to the second bracket 150, or even openings 160 running the entire lengths of the passive tubes 54.

Again with reference to the illustrated embodiment, at least some of the openings 160 are aligned with, or positioned in an area of (e.g., adjacent), the passive tubes 54 proximate the second fan 64B and the fourth fan 74B, as shown, for example, in FIG. 18. Such positions of the openings 160 permit heated air from the burner tubes 52 to enter the open ends of the passive tubes 54, travel along a length of each passive tube 54, and then exit each passive tube 54 (through the openings 160) to the inlets of the second and fourth fans 64B, 74B. This flow can be significantly more desirable than trapping the heated air in the passive tubes 54 or requiring the heated airflow to only navigate around the exterior surfaces of the passive tubes 54.

In an exemplary embodiment, the openings 160 are provided in sets of three, and are offset from one another as shown in the illustrated embodiment. The openings 160 can be provided in just the tops and bottoms of each passive tube 54, or can instead be arrayed around the entire diameter of the passive tube 54. The numbers, sizes, shapes, configurations, spacing, and positioning of the openings 160 can be altered to modify the airflow and the heat distribution desired. Additionally, holes of different sizes can be located in different axial positions along one or more of the tubes 54. For example, additional holes can be provided further down the tubes 54 (i.e., toward the mounting bracket 146) that are larger in size so that air is encouraged to flow further into the passive tubes 54. In an exemplary embodiment, the size and shape of both the passive tubes 54 and the openings 160 can be configured to provide a more uniform or substantially even distribution of flow exiting the passive tubes 54 across the fans 64B, 74B.

Figure 20:
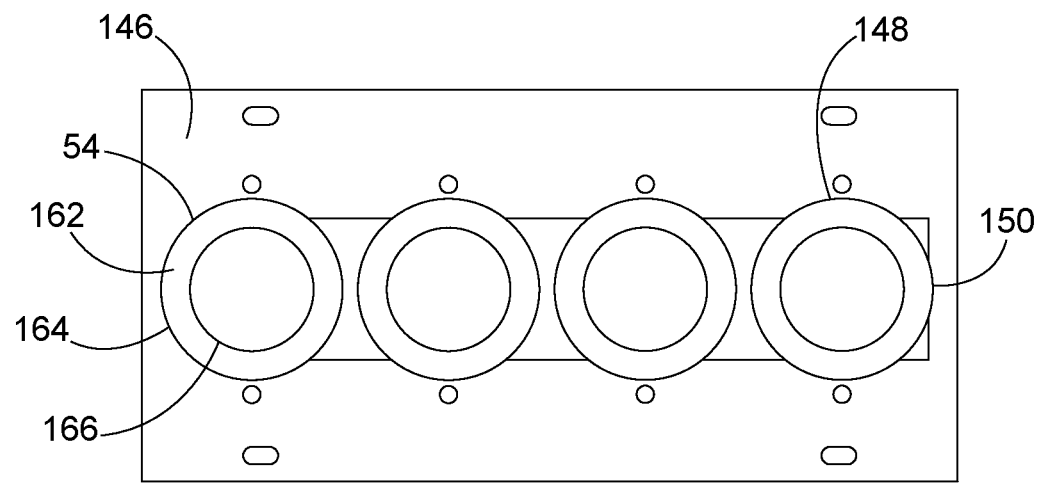
FIG. 20 is a front view of an alternative passive tube assembly including funnels positioned at terminal ends of the passive tubes.
Figure 21:
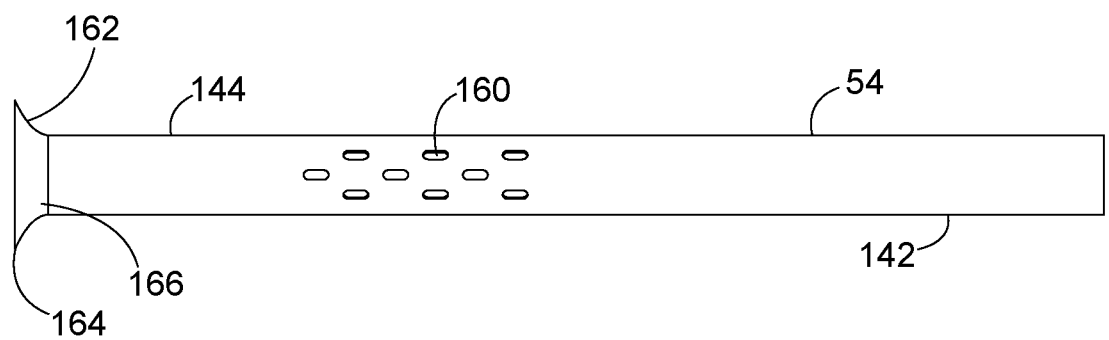
FIG. 21 is a side, sectional view of one of the passive tubes of FIG. 19.

In some cases, it is desirable to enhance the ability of heated airflow to enter the passive tubes 54 from the burner tubes 52. To this end, in some exemplary embodiments a funnel 162 can be positioned in front of the distal openings of each passive tube 54 to encourage air to enter into the passive tubes (and thereafter exit the passive tubes 54 to the fans 64B, 74B, as described above). FIGS. 20 and 21 show an exemplary embodiment of a funnel 162 connected to the distal end 144 of each passive tube 54. The funnel 162 includes a flared end 164 facing toward the burner tubes 52 and a base 166 positioned adjacent, inside, or outside the passive tube 54. The larger end 164 helps direct more air into the passive tube 54. In the illustrated embodiment, the wall of the funnel 162 has a curved cross-sectional profile (e.g., to create a trumpet-shaped funnel 162 that can have a constant or variable radius of curvature, in various embodiments). Other embodiments can include linear sides for a frusto-conical shape. The funnel 162 can be connected to the distal end 144 of the passive tube 54 through any suitable joining process, such as welding or brazing, or through the use of fasteners. Although the funnel 162 is shown positioned entirely outside of the passive tube 54 in the illustrated embodiment, in other embodiments at least a portion of the funnel 162 is positioned inside the passive tube 54. The funnel 162 can also be connected through additional structural components (such as arms or tabs) using fasteners, or by using a friction or mating fit. Other mechanical connections, such as bayonet connection by way of example, can also be used to attach the funnel 162. In some embodiments, the funnel 162 can be cast, molded, or otherwise integrally formed with the passive tube 54.

In some cases, it is desirable to enhance the flow of heated air in and around the passive tube assembly so that the temperature of the air entering the fans 64A,B 74A,B is as even as possible. According to an exemplary embodiment, this can be achieved by having heated air enter a passive tube assembly, travel a distance along the passive tubes, change direction, and then exit the passive tube assembly at some time after the directional change. Having the heated air travel along the passive tube assembly in two directions helps to more evenly heat the passive tubes and the area surrounding the passive tubes. This leads to a more even temperature distribution within the area surrounding the burner tube assembly and the passive tube assembly.

Figure 22:
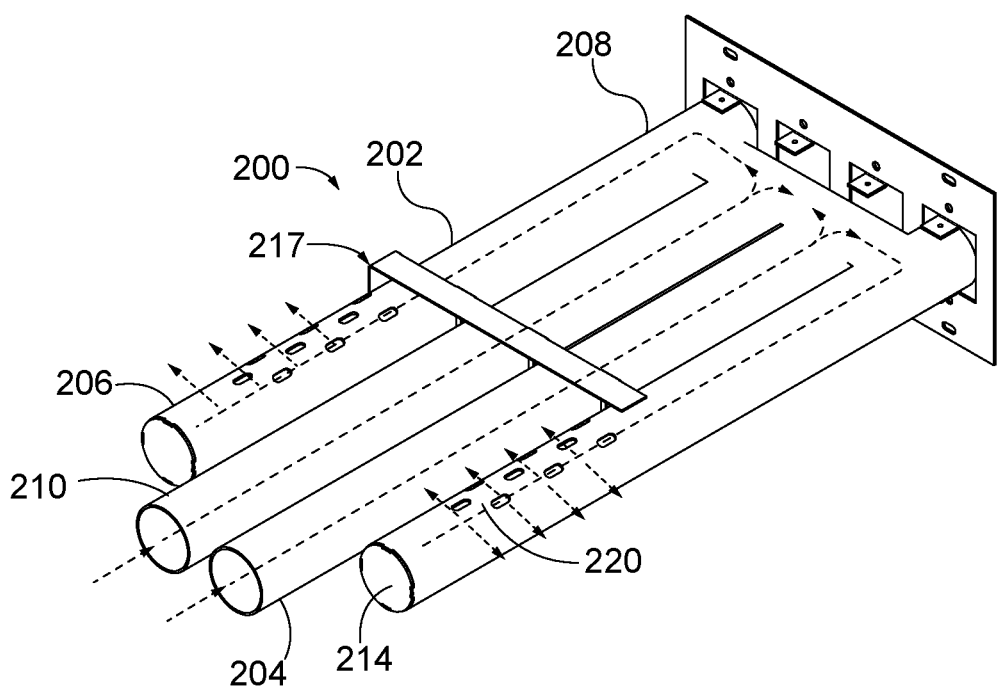
FIG. 22 is a top, perspective view of an alternative embodiment of the passive tubes.

FIG. 22 shows another exemplary embodiment of a passive tube assembly 200 that utilizes a set of outlet tubes 202 and a set of intake tubes 204. The outlet tubes 202 have a front end 206 and a back end 208. The intake tubes 204 also have a front end 210 and a back end 212, with the front end 210 of the intake tubes 204 extending beyond the front end 206 of the outlet tubes 202. Caps 214 are provided to substantially close the front end 206 of the outlet tubes 202. The back end 208 of the outlet tubes 202 are connected to a mounting bracket 216 having a substantially rectangular configuration, although other mounting bracket shapes and sizes can instead be used. A mid mounting bracket 217 is connected to the outlet tubes 202 and the inlet tubes 204. The back ends 212 of the inlet tubes 204 end at a crossover 218. The crossover 218 provides fluid communication between the outlet tubes 202 and the inlet tubes 204 as designated by the dashed flow lines.

During operation, heated air will enter the front end 210 of the inlet tubes 204 and travel along the inlet tubes 204 toward the back ends 212. At the crossover tube 218, the heated air changes direction and enters the back ends 208 of the outlet tubes 202 and travels toward the front end 206. The heated air will exit the outlet tubes 204 via openings 220. The openings 220 can be positioned on the tops and bottoms of the outlet tubes 204. The openings 220 can include any shapes, or sizes, and can be arranged in different patterns. For example, some or all of the openings 220 can be elongated (e.g., in the form of an elongated slit) and arranged in a spiral or helical fashion. As discussed above, at least some of the openings 220 are aligned with, or positioned in an area proximate the second fan 64B and the fourth fan 74B, as shown, for example, in FIG. 18. The fans 64B, 74B create a negative pressure through the openings 220 of the outlet tubes 202 to help draw the heated air through the passive tube assembly 200.

In the exemplary embodiment of FIG. 22 the outlet tubes 202 are positioned on the outside of the assembly 200 and the inlet tubes 204 are positioned on the inside between the outlet tubes 202. In other embodiments, the outlet tubes 202 can be positioned on the inside or the tubes can be staggered so that they alternate between outlet tubes 202 and inlet tubes 204. In this way, the position of the openings 220 can be optimized with respect to the suction of the fan intake. Although depicted as a tube, the crossover 218 can also be a rectangular box or other manifold structure. The box can be attached to the mounting bracket 216 and the tubes 202, 204 welded to the box.

Figure 23:
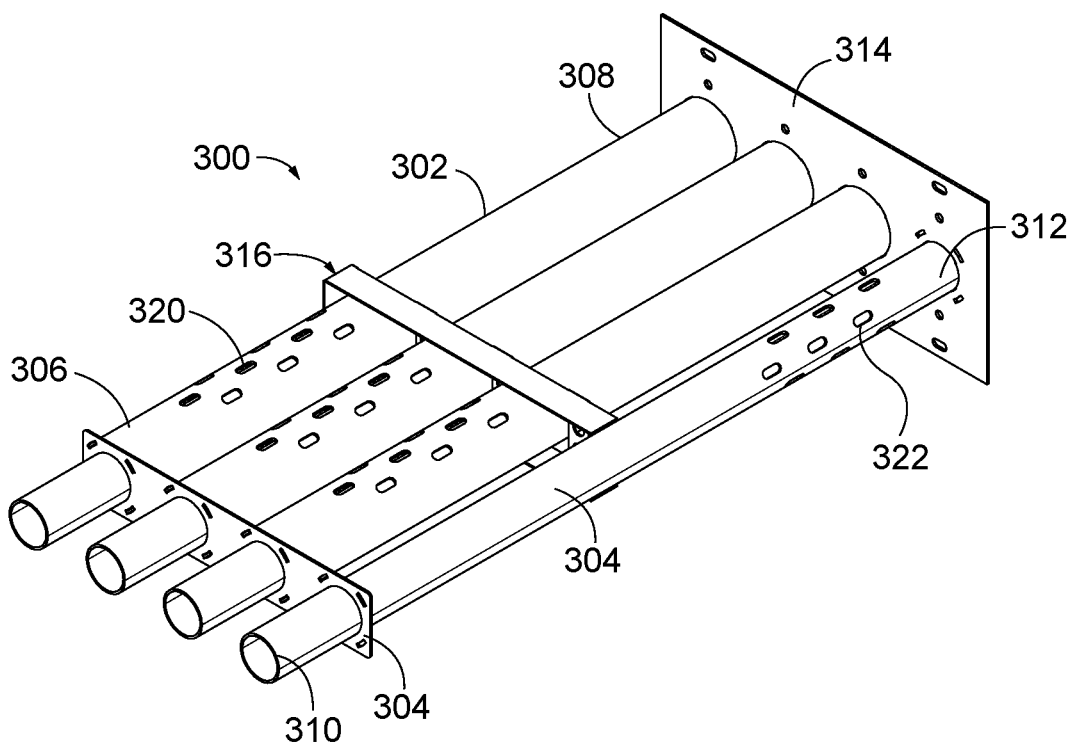
FIG. 23 is a top perspective view of another alternative embodiment of the passive tubes.

FIG. 23 shows another exemplary embodiment of a passive tube assembly 300 that utilizes a set of exterior tubes 302 and a set of interior tubes 304 that are coaxial with the exterior tubes 302. FIG. 23 shows one of the exterior tubes 302 hidden to expose the full interior tube 304. The exterior tubes 302 have a front end 306 and a back end 308. The interior tubes 304 have a front end 310 and a back end 312, with the front end 312 of the interior tubes 304 extending beyond the front end 308 of the exterior tubes 302. The exterior tubes 302 and the interior tubes 304 are connected by a front bracket 318 and a back bracket 314. The exterior tubes 302 include a plurality of front openings 320 formed in the top and bottom of the tubes. The interior tubes 302 include a plurality of back openings 322 formed in the top and bottom of the tubes. The back openings 322 provide fluid communication between the interior tubes 304 and the exterior tubes 306. The openings 320, 322 can include any shapes, or sizes, and can be arranged in different patterns. For example, the openings 320, 322 can be elongated (e.g., in the form of an elongated slit) and arranged in a spiral or helical fashion. In some alternative embodiments, the interior tubes 302 are truncated so that they do not extend fully to the back bracket 314, thereby enabling air to exit from the back end of the interior tubes 304 and to enter the back end of the exterior tubes 306.

Figure 23A:
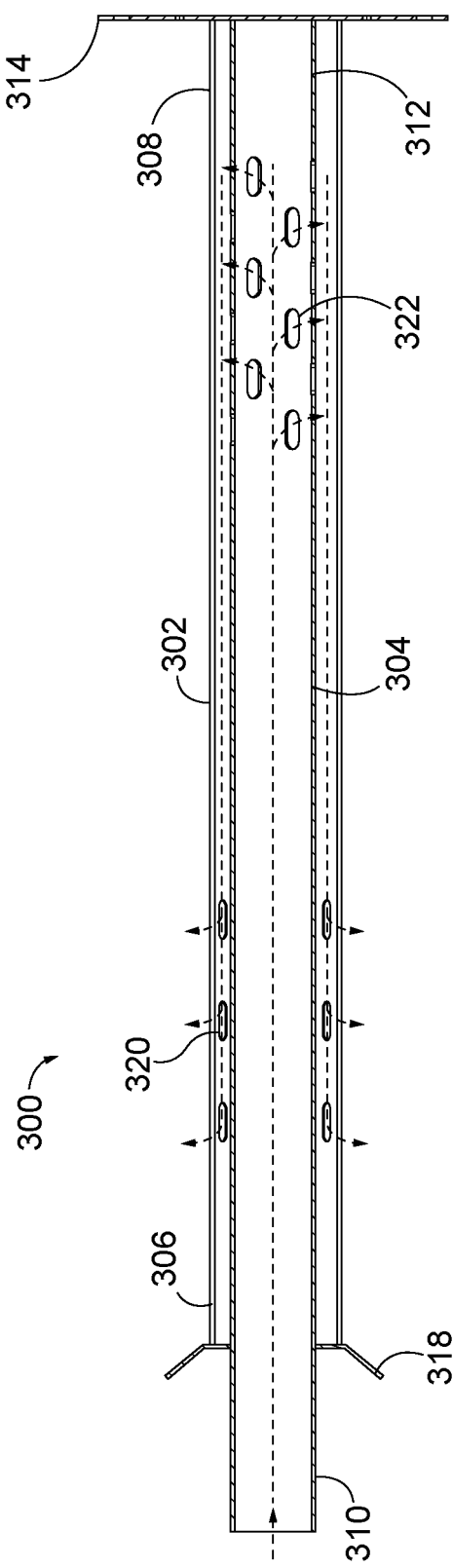

During operation, and as shown in FIG. 23A, heated air will enter the front end 310 of the interior tubes 304 and travel along the interior tubes 304 toward the back ends 312. At the back openings 322, the heated air changes direction and enters the back ends 308 of the exterior tubes 302 and travels toward the front end 306. The heated air will exit the exterior tubes 304 via the front openings 320. As discussed above, at least some of the openings 320 are aligned with, or positioned in an area proximate the second fan 64B and the fourth fan 74B, as shown, for example, in FIG. 18. The fans 64B, 74B create a negative pressure through the openings 320 of the exterior tubes 302 to help draw the heated air through the passive tube assembly 300.

As discussed above, the passive tubes depicted in FIGS. 18-23A are used as baffles that define an airflow passageway having an entrance and an exit, which can be spaced from one another. Each baffle receives heated air from the active tubes 52 through one or more entrances of the baffle, deflects or otherwise creates a change in direction of the received airflow, and then discharges the air through one or more exits of the baffle. In doing so, air originally received from the active tubes 52 can be more evenly distributed to the inlets of the fans 64B, 74B corresponding to the side of the burner compartment 56 in which the baffle (e.g., passive tubes 54) is located. In some embodiments, this airflow arrangement also enables air that is returning from the oven chamber to be heated by the baffle (e.g., passive tubes 54) as it is recycled through the burner compartment 56 and back into the inlets of the fans 64B, 74B. For example, this heat transfer can occur from the back ends 208, 308 of the passive tubes shown in the embodiments of FIGS. 22 and 23. Also, this airflow arrangement can decrease temperature differences and air pressure differences in the burner compartment 56. Increasing the flow of air from the front to the back ends of the baffle (e.g., passive tubes 54) can also help to create a more even temperature distribution across both ends of the burner compartment 56 corresponding to the fans 64A, 74A and 64B, 74B at the different ends of the burner compartment 56. It will be appreciated that baffles having different structure than the tube assemblies depicted in FIGS. 18-23A can be used to achieve the same or similar results. Also, the term "tube" used herein with respect to the different passive tube assemblies in FIGS. 18-23A can relate to any elongated structure having any cross-sectional shape.

Fan Assembly

Figure 24:
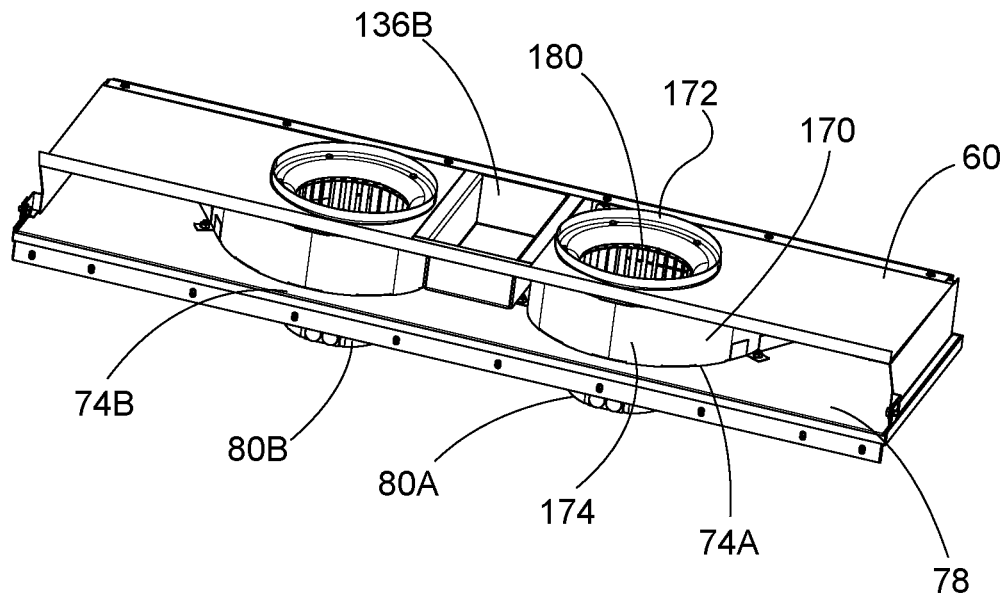
FIG. 24 is a rear perspective view of the lower fan assembly from the heat distribution assembly of FIG. 7.
Figure 25:
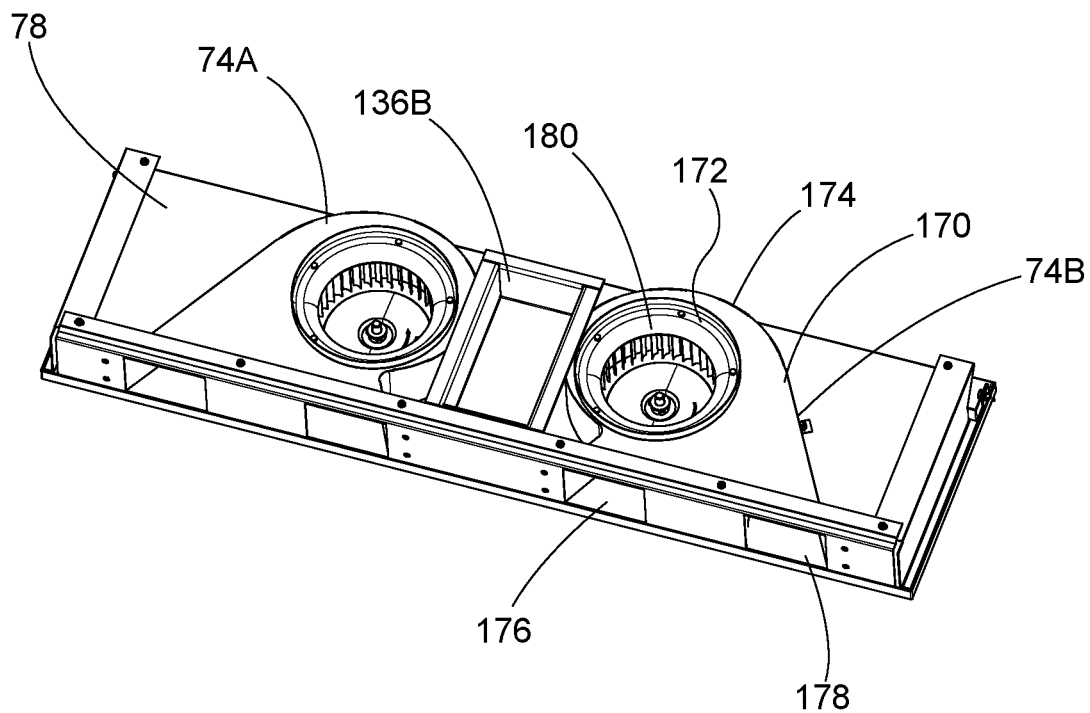
FIG. 25 is a front perspective view of the lower fan assembly of FIG. 20, shown with the first lower shelf removed.
Figure 26:
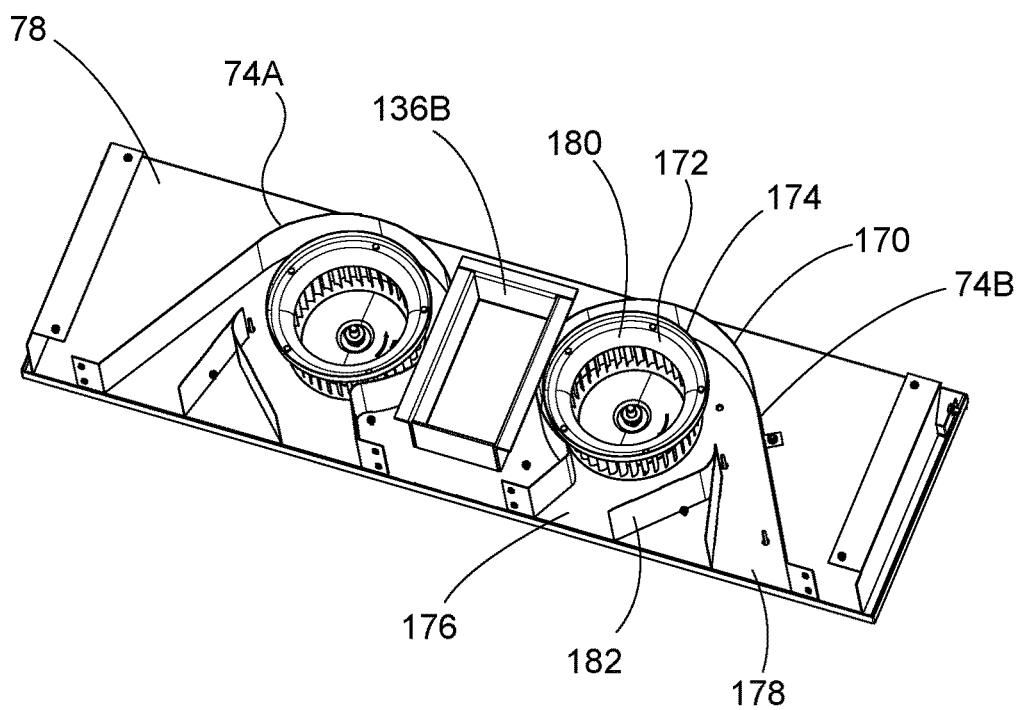
FIG. 26 is a front perspective view of the lower fan assembly of FIG. 21, shown with the top wall of the fan housings removed.

FIGS. 24-26 show the lower fan assembly that includes the third fan 74A and the fourth fan 74B of the illustrated embodiment. It will be appreciated that the upper fan assembly (that includes the first and second fans 64A, 64B) have a similar structure and arrangement that is a mirror image of the lower fan assembly with respect to a horizontal plane. The fans 74A, 74B are centrifugal or scroll fans, with each including a housing 170 that extends between the first lower shelf 60 and the second lower shelf 78. A flange 172 is connected to the housing 170, and extends through and above the first lower shelf 60 to be in communication with the burner tube compartment 56. The flange 172 at least partially defines an air inlet for the fans 74A, 74B, receiving heated air from the burner tube compartment 56. The third and fourth motors 80A, 80B are positioned on an opposite side of the second lower shelf 78 from the fans 74A, 74B. Each motor 80A, 80B is operatively connected to a respective fan 74A, 74B. As discussed above, the motors 80A, 80B are variable speed motors operatively connected to the control assembly 40, although other types of motors 80A, 80B can instead be used as desired.

FIG. 25 shows the lower fan assembly 72 with the first lower shelf 60 removed, and FIG. 26 shows the upper wall of the fan housing 170 removed. Each of the fan housings 170 include a curved portion 174, a first outlet 176, and a second outlet 178. A rotating impeller 180 is positioned in the housing 172, and is operatively connected to a respective motor 80A, 80B. The impellers 180 include a plurality of blades that are designed to draw heated air from the burner tube compartment 56 through the inlet, and discharge the air along the curved section 174 and toward the outlets 174, 176. As best shown in FIG. 26, a baffle 182 is positioned inside of the housing 170, dividing the airflow from the impeller 180 to the first and second outlets 176, 178. The baffle 182 enables each fan 80A, 80B to provide a dual output to more evenly provide heated air to the tunnel 24. As best shown in FIG. 25, each fan outlet 176, 178 is in communication with an outlet conduit 184 configured to provide heated airflow to the tunnel 24.

Heated Air Distribution and Recirculation

Figure 27:
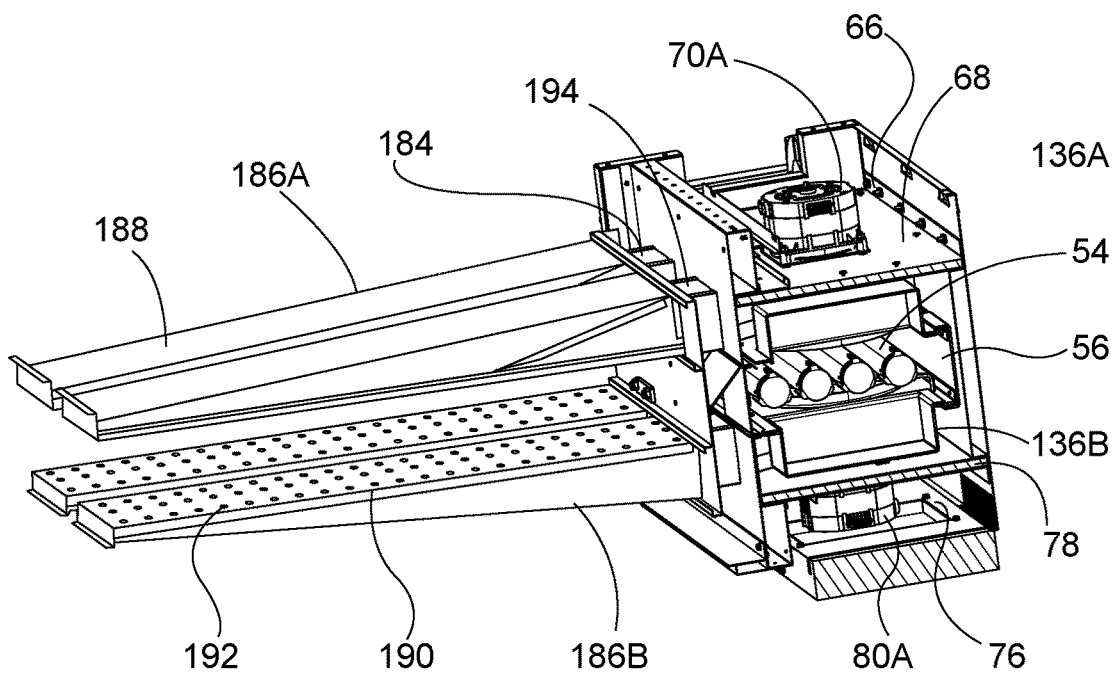
FIG. 27 is a side perspective, sectional view of the heat distribution assembly and fingers of the conveyor oven of FIG. 1.

FIG. 27 shows an exemplary embodiment of components used to distribute heated air to the tunnel 24. A set of upper fingers 186A extends into the tunnel 24 above the conveyor 22, and a set of lower fingers 186B extends into the tunnel 24 below the conveyor 22. The lower fingers 186B can be positioned closer to the conveyor 22 than the upper fingers 186A, although different distances can be used depending on the desired heat distribution. The fingers 186A, 186B are associated with a single outlet conduit 184, so that a set of fingers 186A, 186B will receive air from a single fan. Each finger 186A, 186B includes an angled housing 188 having a wedge-shape configuration and a distribution plate 190 having a series of apertures 192 for supplying air to the tunnel 24. Each finger 186A, 186B is positioned over an outlet conduit 184, with the base of the finger 186A, 186B facing the outlet conduit 184. The fingers 186A, 186B can be slidably connected by utilizing a top rail 194 and a bottom rail 196 positioned in the oven 10.

During operation, heated air is drawn into the fan inlets and pushed out through the divided fan outlets 176, 178 into respective outlet conduits 184. Passing through the conduits 184, the air enters the fingers 186A, 186B and flows through the apertures and into the tunnel 24, heating the tunnel 24 and food products therein. The wedge-shaped housing 188 can keep the flow of air substantially constant across the length of the fingers 186A, 186B, and can reduce turbulence through the finger 186A, 186B by decreasing the volume of the finger 186A, 186B in accordance with the decreasing volume of air as air exits through the apertures 192. The spaces between the outlet conduits 184 can define air returns 194 that are in communication with the burner tube compartment 56. The fans create circulation that draws air from the tunnel 24 back into the burner tube compartment 56 through the air returns 194 to be reheated and distributed back to the tunnel 24.

The foregoing detailed description of the certain exemplary embodiments has been provided for the purpose of explaining the principles of the application and examples of practical implementation, thereby enabling others skilled in the art to understand the disclosure for various embodiments and with various modifications as are suited to the particular use contemplated. This description is not necessarily intended to be exhaustive or to limit the application to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

We claim:

1. A conveyor oven for cooking food, the conveyor oven comprising:
   an oven chamber in which food is cooked;
      a conveyor moveable to convey the food into and out of the oven chamber;
      a burner assembly operable to emit a flame to heat air for convection cooking of food moving through the oven chamber on the conveyor;
      a burner tube extending into a plenum and positioned to receive at least a portion of the flame emitted by the burner assembly;
      a passive tube in the plenum positioned opposite the burner tube, wherein the passive tube includes an open end opposite and facing the burner tube and an outer wall having a plurality of apertures extending through the outer wall; and
      a fan assembly in fluid communication with the plenum and operable to deliver heated air from the plenum to the oven chamber for convection cooking of food moving through the oven chamber on the conveyor.

2. The conveyor oven of claim 1, wherein at least a portion of the apertures on the passive tube are aligned with an inlet of the fan assembly.

3. The conveyor oven of claim 1, wherein the passive tube has a diameter and at least a portion of the apertures on the passive tube are arrayed around the diameter of the passive tube.

4. The conveyor oven of claim 1, wherein the passive tube has a longitudinal axis and the apertures are arrayed in lines extending along the longitudinal axis of the passive tube, and wherein the apertures in immediately adjacent lines are offset from each other.

5. The conveyor oven of claim 1, wherein the passive tube has a length and the apertures extend along the entire length of the passive tube.

6. The conveyor oven of claim 1, wherein the apertures on the passive tube are obround, rectangular, round, or irregularly shaped openings.

7. The conveyor oven of claim 1, further comprising a funnel positioned adjacent the open end of the passive tube, wherein the flared end of the funnel faces the burner tube.

8. The conveyor oven of claim 1, wherein the open end of the passive tube is funnel-shaped and wherein the flared end of the funnel faces the burner tube.

9. The conveyor oven of claim 1, wherein the passive tube further comprises an inner co-axial tube having an open end opposite and facing the burner tube.

10. The conveyor oven of claim 9 wherein the inner co-axial tube includes an outer wall having a plurality of apertures extending through the outer wall.

11. The conveyor oven of claim 9, wherein the inner co-axial tube extends outwardly from the open end of the passive tube.

12. A burner assembly for a conveyor oven for cooking food, the burner assembly operable to emit a flame to heat air for convection cooking of food moving through the oven chamber on the conveyor, the burner assembly comprising:
a burner tube extending into a plenum and positioned to receive at least a portion of the flame emitted by the burner assembly; and
a rifling plate extending within and along a length of the burner tube, wherein the rifling plate is slidingly positioned within the burner tube such that the rifling plate is permitted to lengthen and shorten along the length of the burner tube at different temperatures.

13. The burner tube of claim 12, wherein the rifling plate is rotated about a central point.

14. The conveyor oven of claim 12, wherein the burner tube includes a slot formed in an outer wall, and wherein the rifling plate is rotated about a central point and includes a projection configured to be slidingly received in the slot.

15. The burner assembly of claim 12, wherein the burner tube includes a slot formed in an outer wall, and wherein the rifling plate includes a projection configured to be slidingly received in the slot.

16. The burner tube of claim 15, wherein the slot is formed at a distal end of the burner tube.

17. The burner assembly of claim 12, wherein the rifling plate is slidingly coupled with an outer wall of the burner tube.

18. A conveyor oven for cooking food, the conveyor oven comprising:
an oven chamber in which food is cooked;
a conveyor moveable to convey the food into and out of the oven chamber;
a burner assembly operable to emit a flame to heat air for convection cooking of food moving through the oven chamber on the conveyor;
a burner tube extending into a plenum and positioned to receive at least a portion of the flame emitted by the burner assembly;
a rifling plate extending through the burner tube, wherein the rifling plate is slidingly positioned within the burner tube;
a passive tube in the plenum positioned opposite the burner tube, wherein the passive tube includes an open end opposite and facing the burner tube and an outer wall having a plurality of apertures extending through the outer wall; and
a fan assembly in fluid communication with the plenum and operable to deliver heated air from the plenum to the oven chamber for convection cooking of food moving through the oven chamber on the conveyor.

19. A conveyor oven of claim 18, wherein the passive tube further comprises an inner co-axial tube having an open end opposite and facing the burner tube.

20. The conveyor oven of claim 18, wherein at least a portion of the apertures on the passive tube are aligned with an inlet of the fan assembly.

21. The conveyor oven of claim 18, wherein the passive tube has a diameter and at least a portion of the apertures on the passive tube are arrayed around the diameter of the passive tube.

22. The conveyor oven of claim 18, wherein the passive tube has a longitudinal axis and the apertures are arrayed in lines extending along the longitudinal axis of the passive tube, and wherein the apertures in immediately adjacent lines are offset from each other.

23. The conveyor oven of claim 18, wherein the passive tube has a length and the apertures extend along the entire length of the passive tube.

24. The conveyor oven of claim 18, wherein the apertures on the passive tube are obround, rectangular, round, or irregularly shaped openings.

25. The burner assembly of claim 18, wherein the burner tube includes a slot formed in an outer wall and the rifling plate includes a projection configured to be slidingly received in the slot.

26. The burner tube of claim 25, wherein the slot is formed at a distal end of the burner tube.

27. The burner assembly of claim 18, wherein the rifling plate is slidingly coupled with an outer wall of the burner tube.

* * * * *